(12) United States Patent
Matthiesen et al.

(10) Patent No.: US 11,714,414 B2
(45) Date of Patent: Aug. 1, 2023

(54) AUTONOMOUS VEHICLE PICKUP AND DROP-OFF MANAGEMENT

(71) Applicant: Lyft, Inc., San Francisco, CA (US)

(72) Inventors: Taggart Matthiesen, Kentfield, CA (US); Sebastian Rolf Johan Brannstrom, San Francisco, CA (US); Jess Garms, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 134 days.

(21) Appl. No.: 16/836,747

(22) Filed: Mar. 31, 2020

(65) Prior Publication Data

US 2020/0225663 A1   Jul. 16, 2020

Related U.S. Application Data

(63) Continuation of application No. 15/396,422, filed on Dec. 31, 2016, now Pat. No. 10,613,537.

(51) Int. Cl.
*G05D 1/02* (2020.01)
*G06Q 50/30* (2012.01)
*G06Q 10/02* (2012.01)
*G01C 21/34* (2006.01)
*G01C 21/36* (2006.01)
*G01C 21/00* (2006.01)
*B60R 25/24* (2013.01)
*G05D 1/00* (2006.01)

(52) U.S. Cl.
CPC .............. *G05D 1/021* (2013.01); *B60R 25/24* (2013.01); *G01C 21/3407* (2013.01); *G01C 21/362* (2013.01); *G01C 21/3664* (2013.01); *G01C 21/3889* (2020.08); *G05D 1/0088* (2013.01); *G06Q 10/02* (2013.01); *G06Q 50/30* (2013.01); *G05D 2201/0213* (2013.01)

(58) Field of Classification Search
CPC ................. G05D 1/021; G05D 1/0088; G05D 2201/0213; B60R 25/24; G01C 21/32; G01C 21/3407; G01C 21/362; G01C 21/3664; G06Q 10/02; G06Q 50/30
See application file for complete search history.

(56) References Cited

U.S. PATENT DOCUMENTS

| 6,690,302 | B1 * | 2/2004 | Inomata | G08B 25/016 340/426.2 |
| 8,768,539 | B1 * | 7/2014 | Clement | B60W 50/08 701/2 |
| 10,369,967 | B2 * | 8/2019 | Sako | B60R 25/25 |
| 2002/0121962 | A1 * | 9/2002 | Wolfe | G07C 9/38 340/425.5 |

(Continued)

*Primary Examiner* — Rami Khatib
(74) *Attorney, Agent, or Firm* — Baker Botts L.L.P.

(57) ABSTRACT

Embodiments provide systems, methods and computer-readable medium to manage rider pickup and drop-off for autonomous vehicles. In one embodiment, a method includes receiving a ride request and an associated pickup location from a requestor computing device, matching the ride request to a vehicle, and instructing the vehicle to travel towards the pickup location. When the vehicle reaches the pickup location, an unlock request is received from the requestor computing device to unlock the vehicle. In response to receiving the unlock request, a verification is made that one or more unlock criteria associated with the vehicle are satisfied. If satisfied, a door of the vehicle is unlocked.

20 Claims, 16 Drawing Sheets

(56) References Cited

U.S. PATENT DOCUMENTS

| | | | |
|---|---|---|---|
| 2003/0018428 A1* | 1/2003 | Knockeart | G08G 1/096872 342/357.31 |
| 2016/0098870 A1* | 4/2016 | Bergerhoff | H04W 4/48 340/5.61 |
| 2016/0221501 A1* | 8/2016 | Linden | B60Q 1/323 |
| 2017/0052537 A1* | 2/2017 | Salinas | B60W 30/00 |
| 2017/0061714 A1* | 3/2017 | Odejerte, Jr. | G07C 9/00309 |
| 2017/0075358 A1* | 3/2017 | Zhang | G06Q 10/047 |
| 2017/0115125 A1* | 4/2017 | Outwater | H04W 12/069 |
| 2017/0180388 A1* | 6/2017 | Belz | H04L 63/0853 |
| 2017/0294130 A1* | 10/2017 | Donnelly | H04W 12/50 |
| 2018/0033226 A1* | 2/2018 | Robertson | H04L 63/08 |
| 2018/0039917 A1* | 2/2018 | Buttolo | G06Q 10/0631 |
| 2018/0057013 A1* | 3/2018 | Mullett | B60H 1/267 |
| 2018/0091930 A1* | 3/2018 | Jefferies | G07C 9/00571 |
| 2018/0240067 A1* | 8/2018 | Oz | G07C 9/00182 |
| 2019/0176737 A1* | 6/2019 | Watanabe | G06V 20/58 |
| 2019/0367036 A1* | 12/2019 | Brombach | G06F 21/629 |
| 2020/0026295 A1* | 1/2020 | Schimik | B60R 25/24 |

* cited by examiner

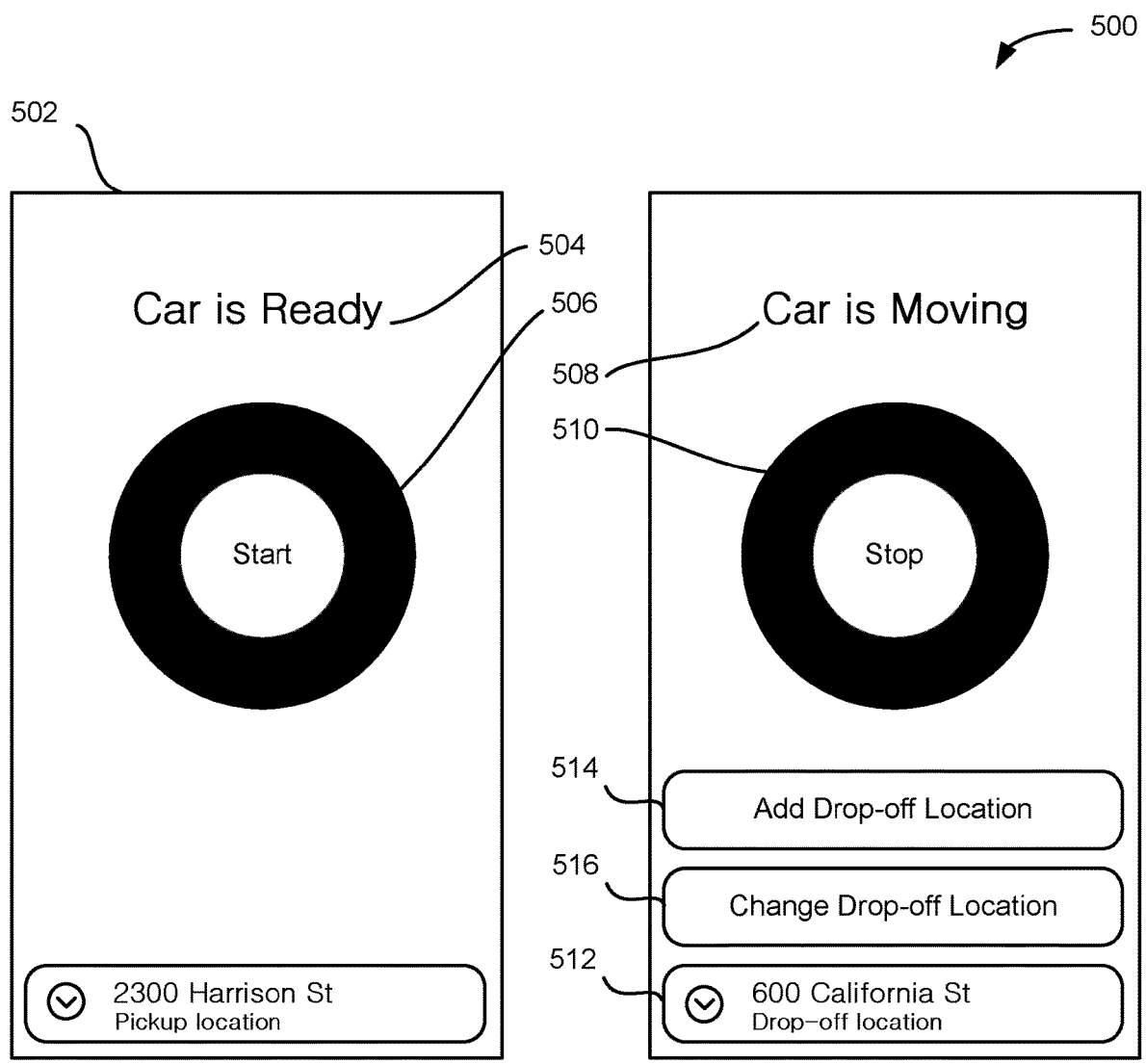
*FIG. 5A*  *FIG. 5B*

AUTONOMOUS VEHICLE PICKUP AND DROP-OFF MANAGEMENT

PRIORITY

This application is a continuation under 35 U.S.C. § 120 of U.S. patent application Ser. No. 15/396,422, filed 31 Dec. 2016, which is incorporated herein by reference.

BACKGROUND

Traditionally, transportation and related services have been provided by a human-operated vehicle. Improvements in computer processing have led to increasing efforts to automate more of these services, using autonomous vehicles that do not require a human operator. However, integrating these autonomously-provided services into a mixed autonomous and human-operated environment has many challenges. Riders are accustomed to interacting with human drivers to provide information and instructions in addition to the information received from a ride matching service. In the absence of a human driver, these instructions may not be so easily conveyed.

BRIEF DESCRIPTION OF THE DRAWINGS

Various embodiments in accordance with the present disclosure will be described with reference to the drawings, in which:

FIGS. 5A and 5B illustrate examples of a graphical user interface for starting and stopping an autonomous vehicle during a ride, in accordance with an embodiment;

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments provide techniques, including systems and methods, to manage rider pickup and drop-off for autonomous vehicles. A user can request a ride through an autonomous ride request GUI. The requester can provide pickup and drop-off locations. Based on the locations, it can be determined whether an autonomous ride is available. If not, alternative ride types can be suggested. If so, an autonomous vehicle can be sent to the pickup location. Embodiments provide pickup and drop-off graphical user interfaces (GUIs), in addition to the autonomous ride request GUI, through which localized pickup and drop-off information may be received. When an autonomous vehicle is within a threshold distance of the pickup or drop-off location, the corresponding GUI can be displayed. The GUI can include one or more selectable localized location elements. The requestor may then select the element corresponding to a desired location to be picked-up or dropped-off.

Figure 1:
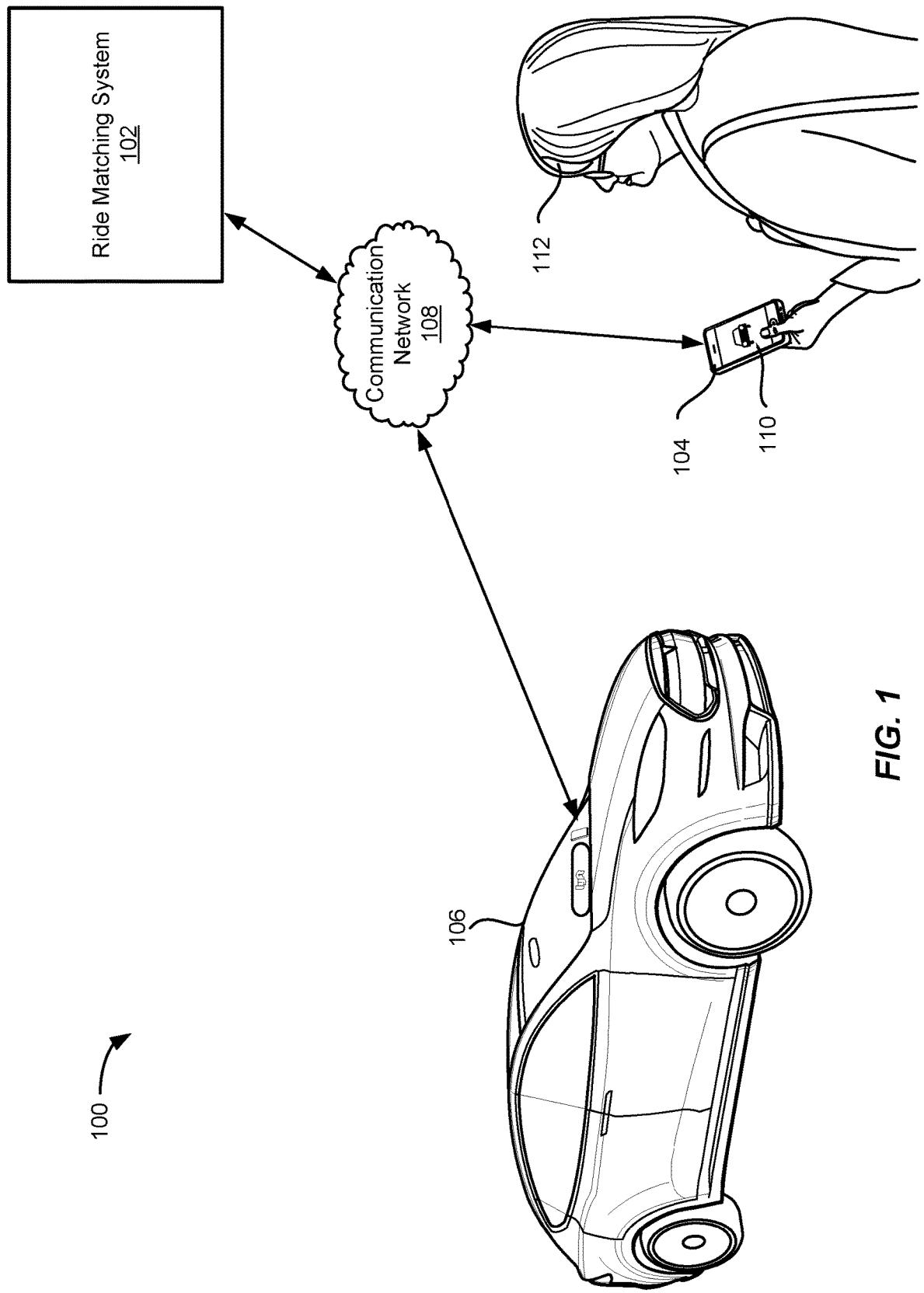
FIG. 1 illustrates an example of an ride matching system including a matched requester and matched autonomous vehicle, in accordance with an embodiment.

FIG. 1 illustrates an example of an autonomous ride matching service 100 including a matched requestor and matched autonomous vehicle, in accordance with an embodiment. A ride matching system 102 may be configured to communicate with both the requestor computing device 104 and autonomous vehicle 106. In various embodiments, autonomous vehicle 106 may include a communications device integrated into the autonomous vehicle that is configured to communicate with ride matching system 102. Additionally, or alternatively, a separate computing device operable to communicate with both the ride matching system 102 and the autonomous vehicle 106 may be used to control the autonomous vehicle. A requestor 112 may use a ride matching requestor application 110 on a requestor computing device 104 to request a ride at a specified pick-up location. The request may be transmitted over a communication network 108 to the ride matching system 102. In some embodiments, ride matching system 102 may manage both autonomous and non-autonomous vehicles. For example, depending on a requestor's pickup and/or drop-off locations, autonomous vehicles and non-autonomous vehicles may be available to complete the ride.

The ride matching system 102 may identify available autonomous vehicles that are within a predetermined distance and/or expected pickup time away from the requestor 112. The ride matching system 102 may send the ride request to autonomous vehicle 106 which may then proceed upon a route to the pickup location provided by requestor 112. The route may be determined by ride matching system 102, autonomous vehicle 106, or any combination thereof. As discussed further herein, due to the lack of a human operator, pickups and drop-offs by autonomous vehicles may introduce new challenges. For example, in a non-autonomous scenario, at drop-off a rider may tell a driver where along a block to drop them off. However, with no driver, an autonomous vehicle may be guided to the specific drop-off location without additional input. Similarly, at pickup, a human driver may identify a location that is less in the way of traffic but still near the requested location, while an autonomous vehicle may not be able to identify such a location.

Figure 2A:
FIGS. 2A-2C illustrate example graphical user interfaces for requesting pickup by an autonomous vehicle, in accordance with an embodiment.
Figure 2B:
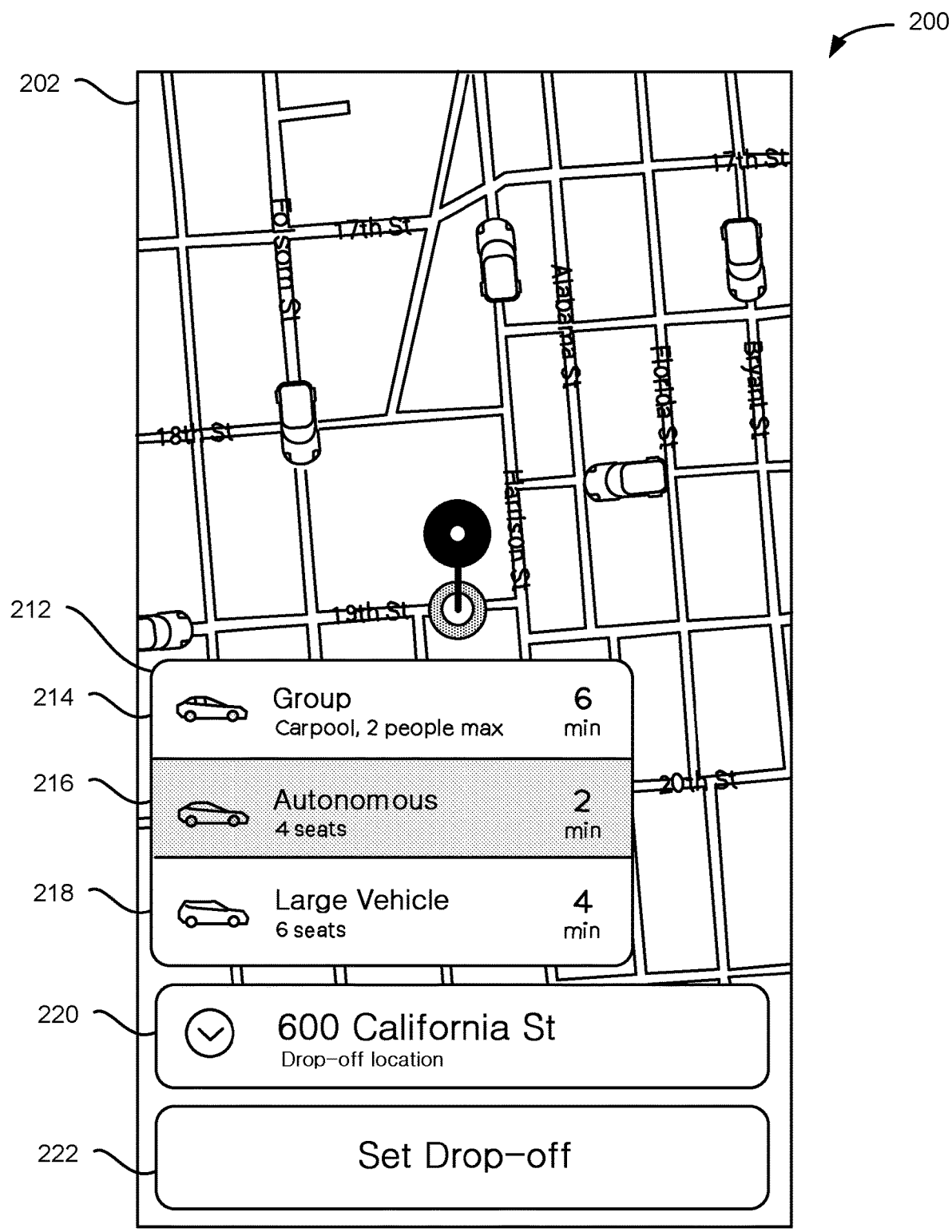
Figure 2C:
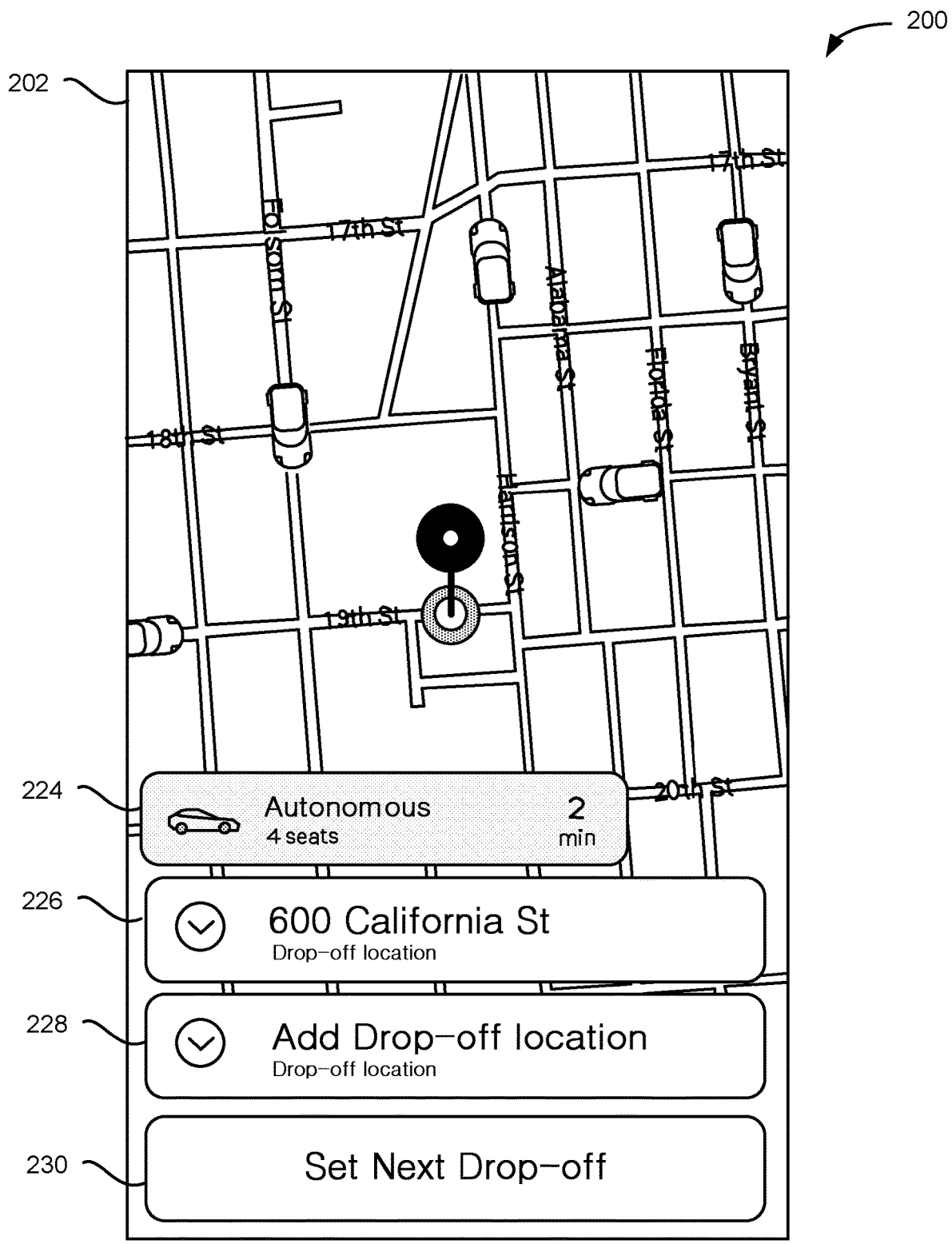

FIGS. 2A-2C illustrate example graphical user interfaces 200 for requesting pickup by an autonomous vehicle, in accordance with an embodiment. As shown in FIG. 2A, a ride request graphical user interface (GUI) 202 can show a map of an area where the requestor is located. The map may include icons, such as vehicles 204, representing available vehicles in the area. Each icon may be located on the map at a location corresponding to an approximate real time location of the corresponding vehicle. In some embodiments, the requestor's location may be determined using information received from a location module, such as a GPS unit or similar device, in the requestor's device. An approximate location may be automatically populated into a pickup location field 206 and a selectable pin 208 may be shown on the map at the approximate location. The pin 208 may be relocated by the requestor on the map to a requested pickup location. Once the requestor has determined the pin 208 is at the correct pickup location, the requestor can select element 210 to send a request to the ride matching system for a ride at the pickup location selected using pin 208.

As shown in FIG. 2B, after setting the pickup location, a ride selection element 212 can be displayed in the ride request GUI 202. The ride selection element 212 can include available types of vehicles available to complete the ride. For example, a group carpool option 214, an autonomous option 216, and a large vehicle option 218 may be provided, as shown. Additional, fewer, or alternative types of rides may similarly be presented. Each option can include a description of the ride and estimated time of arrival. In some embodiments, depending on the selected type, additional information may be required before the ride can be confirmed. For example, as shown in FIG. 2B, autonomous option 216 has been selected (as shown by shading). In some embodiments, autonomous vehicles may be limited to particular routes or particular geographic areas, limiting the availability of this option if, e.g., the drop-off location is not within one of these regions. As such, drop-off element 220 can be displayed and a drop-off location, such as a street address or other location identifier, can be received. The requestor can select element 222 to set the drop-off location based on the entered location identifier. The location identifier can be sent to the ride matching system to determine whether an autonomous vehicle is available for that drop-off location. In some embodiments, if an autonomous vehicle is not available for that drop-off location and/or between the requested pickup and drop-off locations, a message can be displayed indicating the lack of availability and autonomous option 216 can be removed from ride selection element 212. In some embodiments, if an autonomous vehicle is not available to service the request, the requestor may be automatically matched to a different type of ride.

As shown in FIG. 2C, autonomous ride option 216 has been requested. The other ride options have been removed, leaving the selected autonomous option displayed at element 224. The current drop-off location is set at element 226, and the option to add one or more drop-off locations 228 is shown. In some embodiments, element 226 can be selected to change the current drop-off location. As discussed with respect to FIG. 2B, a street address or other location identifier can be entered into element 226 and the new drop-off location can be checked by the ride matching system to determine whether the autonomous vehicle is available for that location. In some embodiments, additional drop-off locations to follow the current drop-off location can be entered at element 228. As discussed, when the additional drop-off location is set by selecting element 230, the additional drop-off location can be sent to the ride matching system to determine whether the autonomous vehicle is available for that location. If the autonomous vehicle is not available for the additional, or new, drop-off location, the requestor can be presented with the option to cancel the autonomous ride and request a different ride type.

Figure 3:
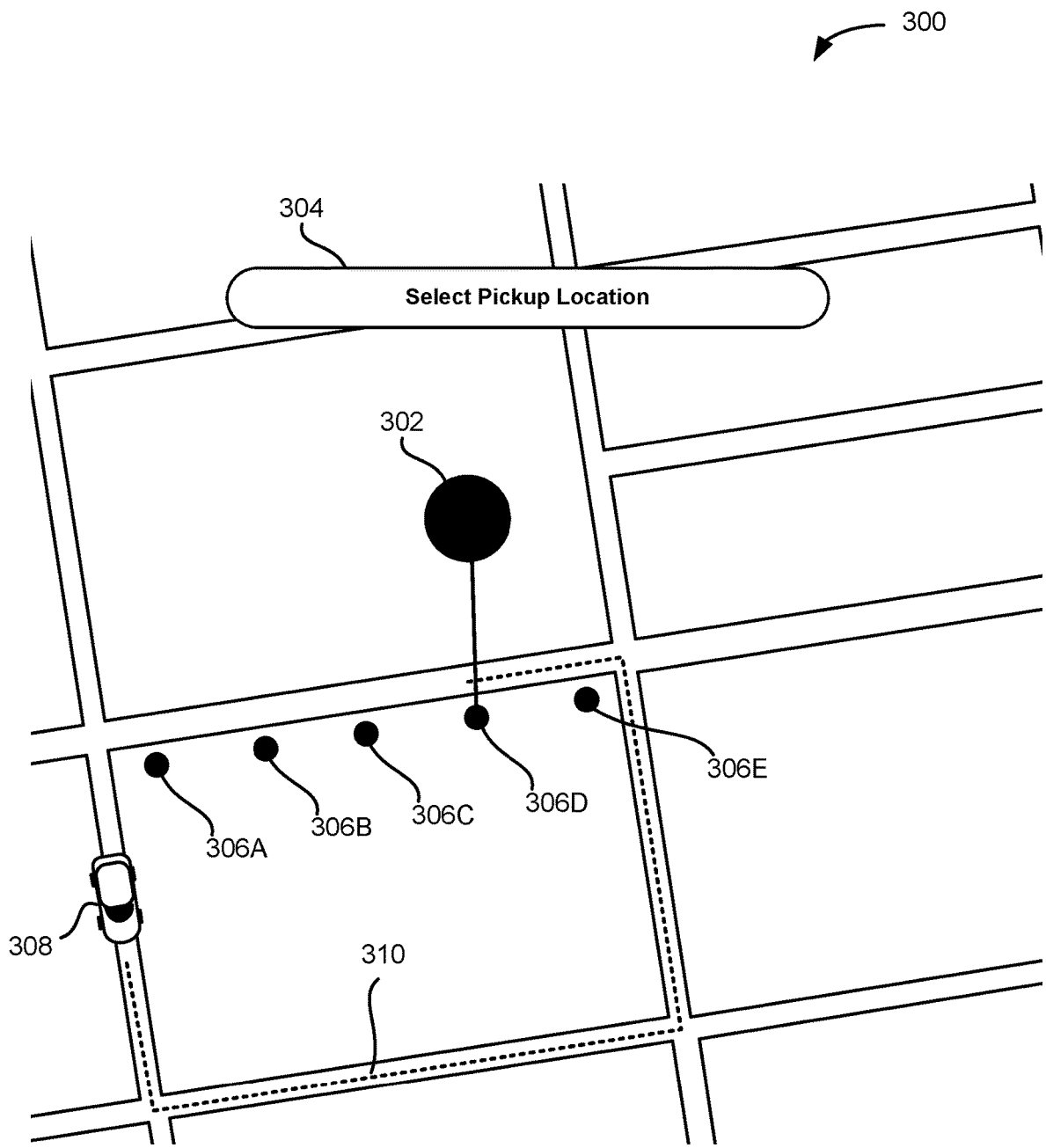
FIG. 3 illustrates an example graphical user interface for selecting a pickup location, in accordance with an embodiment.

FIG. 3 illustrates an example graphical user interface 300 for selecting a pickup location, in accordance with an embodiment. In some embodiments, after the autonomous ride option has been selected and the route confirmed, a select pickup GUI can be displayed which provides the requestor to select a particular pickup location. The pickup GUI can be displayed any time after the ride has been matched and/or when it is determined that the autonomous vehicle is within a threshold distance of the pickup location. In some embodiments, the select pickup GUI 302 can be a zoomed-in view of the pickup location shown in FIGS. 2A-2C (e.g., zoomed-in to a street, block, or other more localized view). In some embodiments, the pickup location can include an image or photographic representation of the location. This representation may include a view of the pickup location as a viewer would see it from the street or sidewalk. In some embodiments, location information may also be shown. The location information may include one or more of an address, an establishment name (e.g., restaurant, bar, or other business name) for an establishment at or near the location, recommended nearby locations to visit, or other location information. In some embodiments, each location may be associated with different rates. The select pickup GUI may display each localized pickup location and corresponding rate to the requestor. For example, a pickup location at a less busy intersection may be priced differently than a pickup location at high traffic intersection.

As shown in FIG. 3, a pin 302 can automatically be located at a pickup location. If the location is acceptable to the requestor, the requestor can tap or otherwise select element 304. A message can then be sent to the ride matching system indicating the selected pickup location. As shown, multiple pickup locations 306A-E close to the requestor's pickup location may be available. In some embodiments, the pin 302 may snap to these pickup locations. The pickup locations may be predefined by the ride matching system and may each be associated with an identifier which the ride matching system may use to identify corresponding location data (e.g., in a look-up table, database, or other data structure). Instructions may then be sent to autonomous vehicle 308, including route 310, to arrive at the selected pickup location 306D. In some embodiment, the pickup location may be selected automatically, if the requestor does not specify a different location within a particular time period (e.g., the pickup location selection process may time-out).

Figures 4A, 4B:
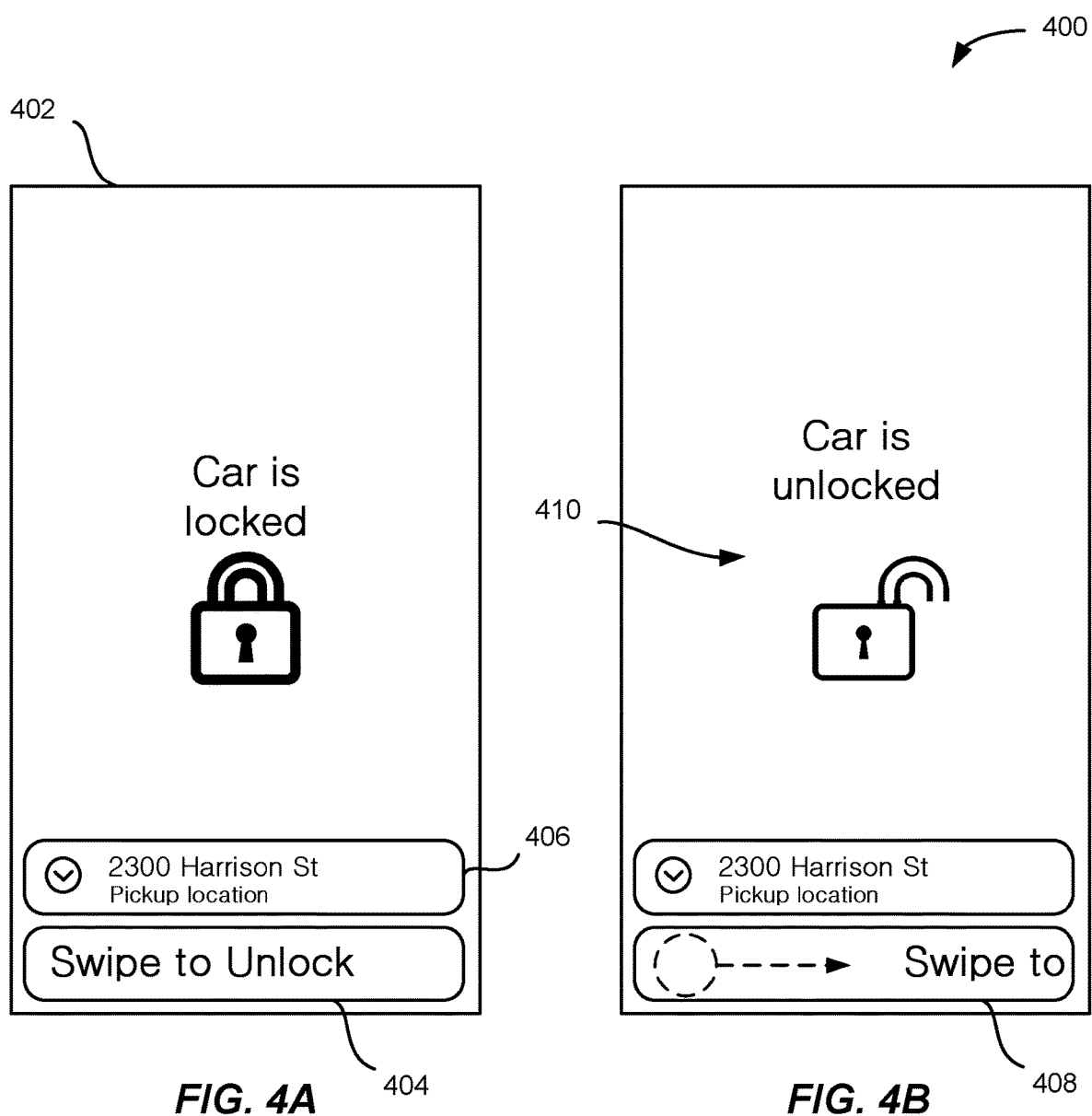
FIGS. 4A and 4B illustrate examples of a graphical user interface for unlocking an autonomous vehicle, in accordance with an embodiment.

FIGS. 4A and 4B illustrate examples of a graphical user interface 400 for unlocking an autonomous vehicle, in accordance with an embodiment. As shown in FIG. 4A, an unlock GUI 402 can be displayed on a requestor device. The unlock GUI can indicate that the autonomous vehicle is currently locked and include a selectable element 404 to unlock the autonomous vehicle. In some embodiments, the unlock GUI 402 can be displayed when the autonomous vehicle is determined to be at the pickup location 406. The selectable element 404 may be selected by tapping, clicking, or otherwise selecting the element. For example, as shown in FIGS. 4A and 4B, the element 404 may be swiped to unlock the autonomous vehicle. When the element is swiped 408 (e.g., by tapping and dragging on a touchscreen interface) a request can be sent to the ride matching system to unlock the vehicle. In some embodiments, the ride matching system can verify the location of the autonomous vehicle, the state of the autonomous vehicle (e.g., moving, stopped, etc.), and determine that the requestor device is authorized to unlock the autonomous vehicle. Once verified and/or authorized, an unlock instruction can be sent to the autonomous vehicle and the unlock GUI 402 can be updated to indicate 410 that the autonomous vehicle is unlocked. In some embodiments, the requestor device may connect directly to the autonomous vehicle. For example, the requestor device may pair with the autonomous vehicle over Bluetooth or other wireless communication system and send a request via the paired connection to unlock the vehicle.

FIGS. 5A and 5B illustrate examples of a graphical user interface 500 for starting and stopping an autonomous vehicle during a ride, in accordance with an embodiment. As shown in FIG. 5A, when the requestor has entered the autonomous vehicle, an in-ride GUI 502 can be displayed on the requestor device and/or on an in-vehicle device. The in-ride GUI 502 can indicate an autonomous vehicle status or other messages for the requestor. For example, safety instructions (e.g., fasten seatbelts, secure belongings, etc.) can be displayed 504. A GUI element 506 can be displayed enabling the requestor to start the autonomous ride. The GUI element 506 may be selected by tapping, clicking, or otherwise selecting the element. For example, as shown in FIG. 5A, the element 506 may be tapped to start the autonomous ride. When the element is tapped on the in-ride GUI displayed on the requestor device, a request can be sent to the ride matching system to begin the ride. In some embodiments, the ride matching system can verify that the requestor device is in the autonomous vehicle and is authorized to start the ride. For example, sensors in the vehicle may determine that the requestor device is in the car by, e.g., pairing with the device over Bluetooth or other wireless communication system. In some embodiments, an optical sensor, such as a camera, may identify the requestor inside the vehicle (e.g., using facial recognition or other image processing techniques) to determine that the requestor device is in the vehicle. Once verified and/or authorized, a start ride instruction can be sent to the autonomous vehicle and the in-ride GUI 502 can be updated to indicate 508 that the autonomous vehicle is moving and the ride has begun. In some embodiments, where the start request is received from an in-vehicle device, the ride can be started without first contacting the ride matching system.

As shown in FIG. 5B, after the ride has started, ride start element 506 can be replaced by ride stop element 510. When ride stop element 510 is selected, the autonomous vehicle can begin an end ride process. For example, the autonomous vehicle can identify a safe location to end the ride (e.g., by pulling to the side of the road or onto a side street). In some embodiments, an end ride GUI, as discussed below, may be displayed, enabling the requestor to select a drop-off location in the vicinity of the current location of the autonomous vehicle. As discussed, prior to initiating the autonomous ride, the requestor can provide a drop-off location 512. In some embodiments, additional drop-off locations can be added 514 to the current route. As discussed, a street address or other location identifier can be entered into element 514 and the additional drop-off location can be checked by the ride matching system to determine whether the autonomous vehicle is available for that location. Similarly, the current drop-off location can be changed by entering a street address or other location identifier can be entered into element 516. If the autonomous vehicle is not available for the additional, or new, drop-off location, the requestor can be presented with the option to continue to the current drop-off location, end the autonomous ride, and/or request a different ride type.

Figure 6:
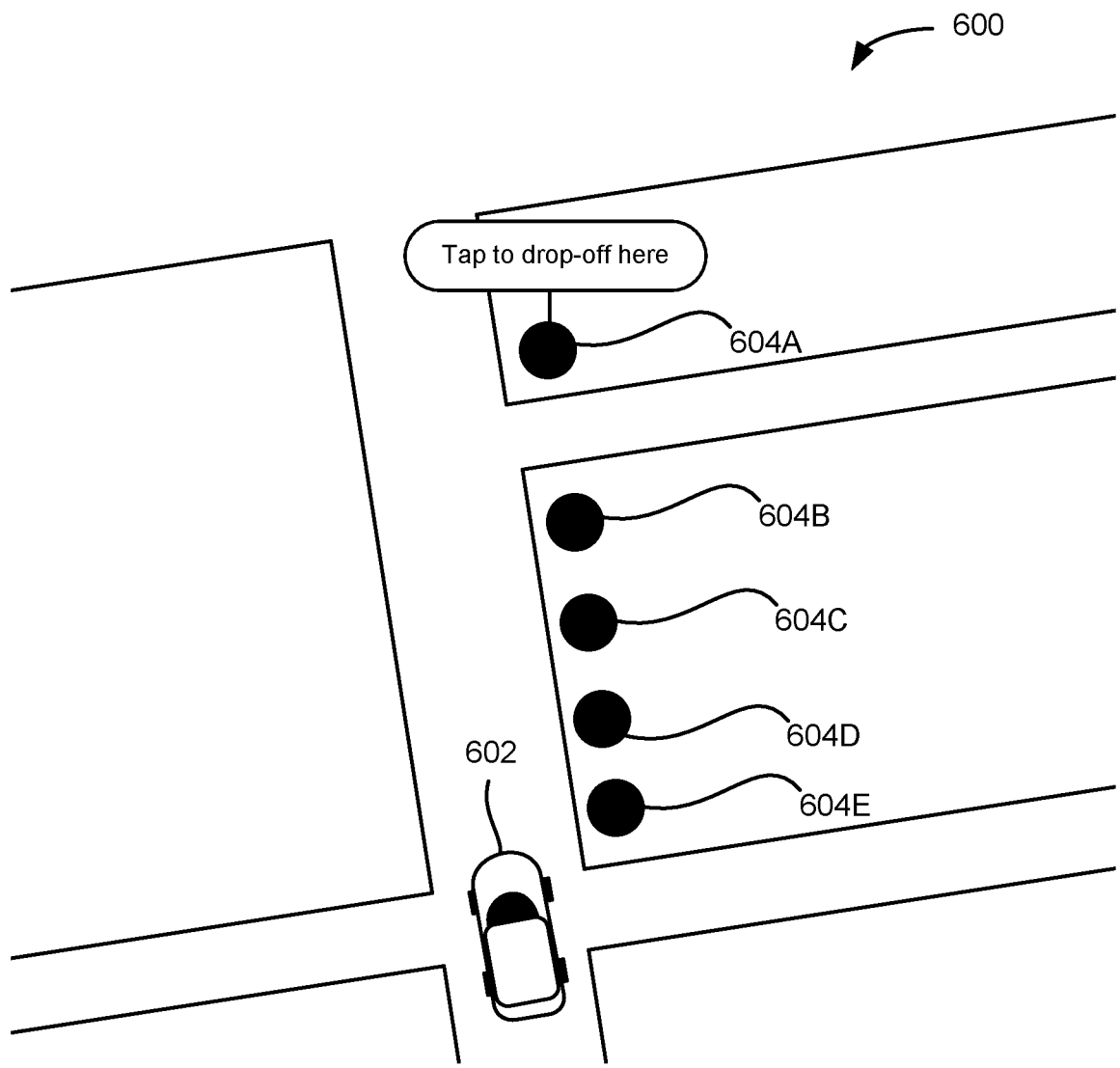
FIG. 6 illustrates an example graphical user interface for selecting a drop-off location, in accordance with an embodiment.

FIG. 6 illustrates an example graphical user interface 600 for selecting a drop-off location, in accordance with an embodiment. As shown in FIG. 6, a drop-off GUI can be displayed after the autonomous ride has started. In some embodiments, the current location of the autonomous vehicle can be monitored and compared to the selected drop-off location. When the current location of the autonomous vehicle 602 is within a threshold distance of the drop-off location the drop-off GUI can be displayed. As shown in FIG. 6, a localized view of the drop-off location can be displayed including one or more drop-off locations 604A-E. A drop-off location can be selected by tapping on the desired drop-off location. The drop-off locations may be predefined by the ride matching system and may each be associated with an identifier which the ride matching system may use to identify corresponding location data (e.g., in a look-up table, database, or other data structure). In some embodiments, the drop-off location can include an image or photographic representation of the location. This representation may include a view of the drop-off location as a viewer would see it from the street or sidewalk. As discussed with respect to pickup locations, in some embodiments, location information may also be shown for drop-off locations. The location information may include one or more of an address, an establishment name (e.g., restaurant, bar, or other business name) for an establishment at or near the location, recommended nearby locations to visit, or other location information. In some embodiments, each location may be associated with different rates. The select drop-off location GUI may display each localized drop-off location and corresponding rate to the requestor. For example, a drop-off location at a less busy intersection may be priced differently than a drop-off location at high traffic intersection. In some embodiments, rates may be determined based on how a location positions the autonomous vehicle for a next ride. For example, a drop-off location may be associated with a lower rate if that location enables the autonomous vehicle to pick up a next ride more quickly. Instructions may then be sent to autonomous vehicle 602, to go to the selected drop-off location 604A. In some embodiment, the drop-off location may be selected automatically if the requestor does not specify a different location within a particular time period (e.g., the drop-off location selection process may time-out). In some embodiments, a pin may be displayed, such as in the pickup examples discussed above, and the desired drop-off location may be selected by dropping the pin on the desired location. The pin may snap to each drop-off location 604A-E.

Figures 7A, 7B:
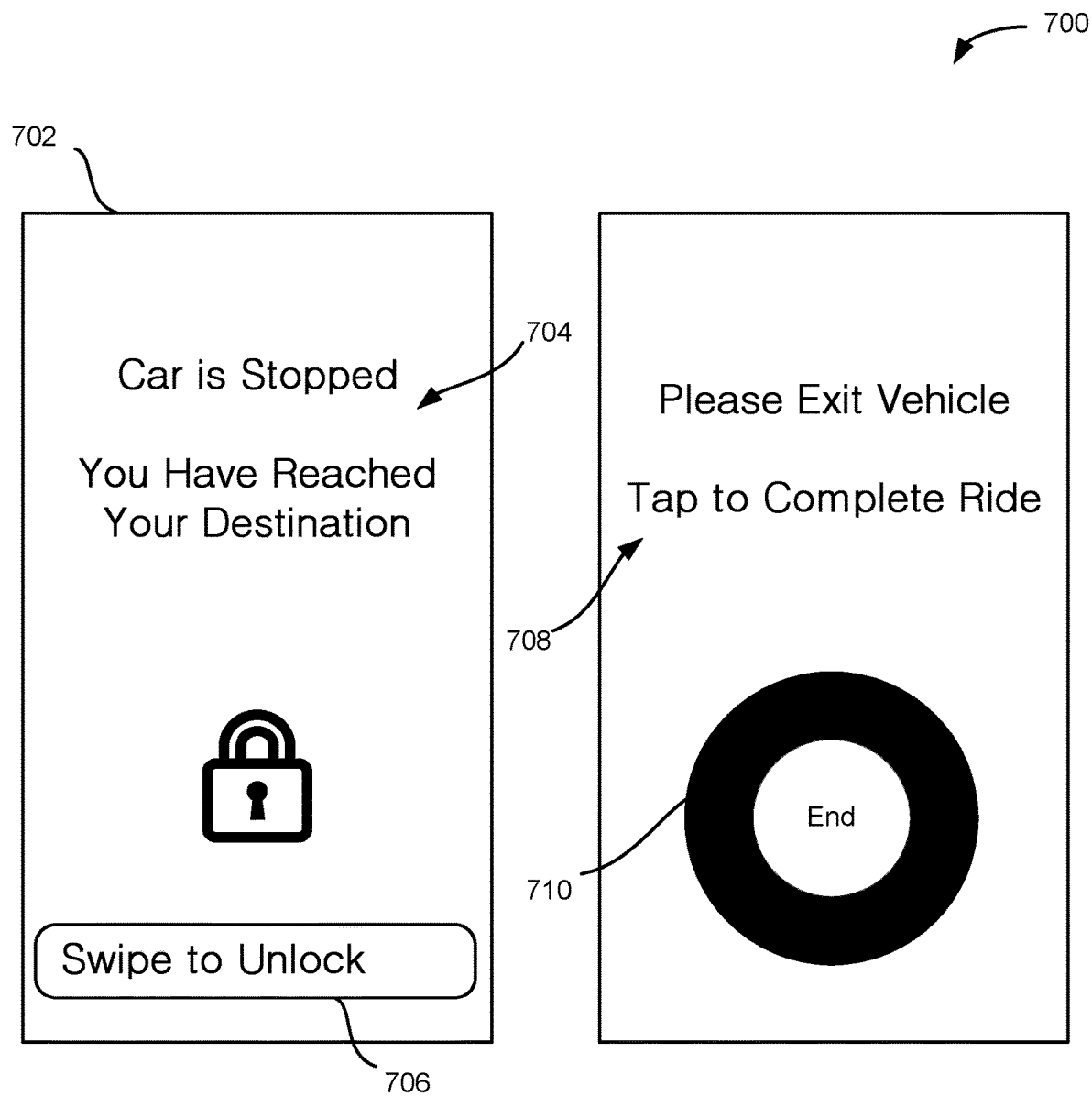
FIGS. 7A and 7B illustrate examples of a graphical user interface for completing a ride with an autonomous vehicle, in accordance with an embodiment.

FIGS. 7A and 7B illustrate examples of a graphical user interface 700 for completing a ride with an autonomous vehicle, in accordance with an embodiment. As shown in FIG. 7A, when the autonomous vehicle has reached the drop-off location, an end-ride GUI 702 can be displayed on the requestor device and/or an in-vehicle device. The end-ride GUI can include a message 704 indicating the vehicle status (e.g., stopped, stopping, etc.) and a message indicating that the autonomous vehicle has reached the drop-off location. An unlock element 706 can be displayed. When the unlock element 706 is selected (e.g., by tapping and dragging on a touchscreen interface) a request can be sent to the ride matching system to unlock the vehicle. In some embodiments, the ride matching system can verify the location of the autonomous vehicle, the state of the autonomous vehicle (e.g., moving, stopped, etc.), and determine that the requestor device is authorized to unlock the autonomous vehicle. Once verified and/or authorized, an unlock instruction can be sent to the autonomous vehicle and the end-ride GUI 702 can be updated. In some embodiments, where the end-ride GUI is accessed through an in-vehicle device, the autonomous vehicle can unlock the vehicle directly.

As shown in FIG. 7B, the end-ride GUI can be updated to provide instructions 708 to the requestor to exit the vehicle to complete the ride. In some embodiments, an end-ride element 710 can be displayed. When selected, a message can be sent to the ride matching system to confirm that the ride has completed. The autonomous ride matching service may then update the status of the autonomous vehicle. For example, based on the number of rides performed by the vehicle, the vehicle may be made available for additional rides, returned to a vehicle dispatch for maintenance, or sent to a high-demand area to be assigned for future rides.

Figure 8:
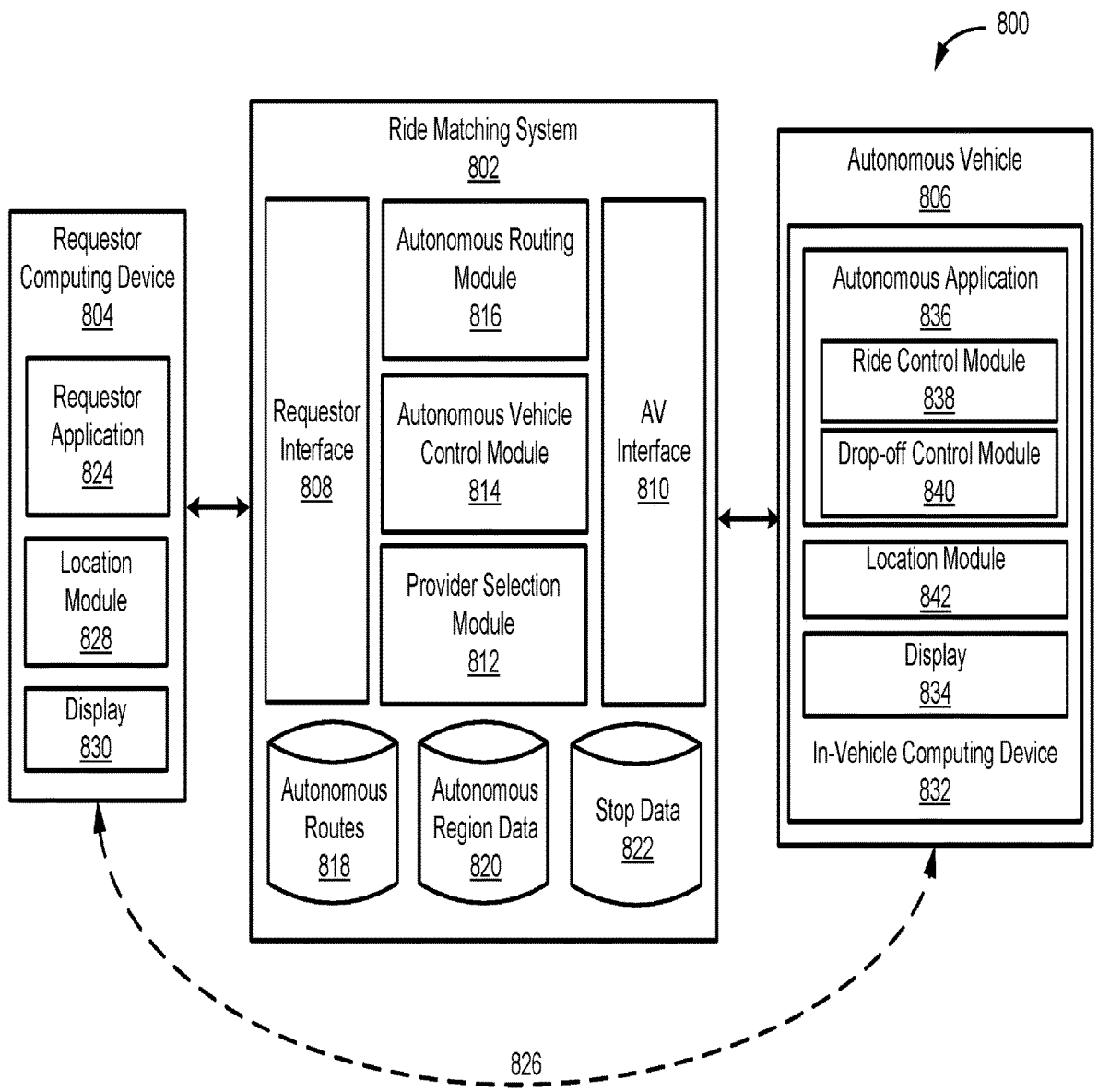
FIG. 8 illustrates an example block diagram of an autonomous ride system, in accordance with an embodiment.

FIG. 8 illustrates an example block diagram 800 of an autonomous ride system, in accordance with an embodiment. As described above, the ride matching system 802 may identify and facilitate request ride matching requestors received from requestor computing devices 804 with available providers, such as autonomous vehicles 806. The ride autonomous matching system 802 may include a requestor interface 808, an autonomous vehicle (AV) interface 810, a provider selection module 812, an autonomous vehicle control module 814, and an autonomous routing module 816. The ride matching system 802 may also include an autonomous routes data store 818, an autonomous region data store 820, and a stop data store 822, each of which may be used by any of the modules of the ride matching system 802 to obtain information in order to perform the functionality of the corresponding module. The ride matching system 802 may be configured to communicate with a plurality of requestor computing devices 804 and a plurality of autonomous vehicles 806 or other provider computing devices. Although the ride matching system 802 is shown in a single system, the ride matching system 802 may be hosted on multiple server computers and/or distributed across multiple systems. Additionally, the modules may be performed by any number of different computers and/or systems. Thus, the modules may be separated into multiple services and/or over multiple different systems to perform the functionality described herein.

The requestor interface 808 may include any software and/or hardware components configured to send and receive communications and/or other information between the ride matching system 802 and a plurality of requestor computing devices 804. The requestor interface 808 may be configured to facilitate communication between the ride matching system 802 and a requestor application 824 operating on a requestor computing device 804. The requestor interface 808 may be configured to periodically receive ride requests, location information, a request location (also referred to as a "pick-up" location), a drop-off location, a ride type, autonomous vehicle operating instructions, autonomous ride information, and/or any other relevant information from the requestor computing device 804 when the requestor application 824 is active on the requestor computing device 804. A ride request may include a requestor identifier, location information for the requestor computing device 804, a pick-up location for the ride request, one or more drop-off locations, a pick-up time, and/or any other suitable information associated with providing a service to a requestor. The ride request may be sent in a single message or may include a series of messages. Additionally, the requestor interface 808 may be configured to send ride match messages, autonomous vehicle location information, travel routes, pick-up estimates, traffic information, requests for autonomous ride instructions, autonomous vehicle status information, updates/notifications, and/or any other relevant information to the requestor application 824 of the requestor computing device 804.

In various embodiments, a requestor computing device 804 may include any computing device that is configured to communicate with ride matching system 802 and/or autonomous vehicle 806 over one or more communication networks. The requestor computing device 804 may comprise a processor, a computer-readable memory, and communication hardware and/or software to allow the requestor computing device 804 to communicate over one or more communication networks. For example, a requestor computing device 804 may include a mobile phone, a tablet, a smart watch, a laptop computer, a desktop computer, and/or any other suitable device having a processor, memory, and communication hardware. In some embodiments, the requestor computing device 804 may include a requestor application 824 that is configured to manage communications with the ride matching system 802 and interface with the user of the requestor computing device 804. The requestor application 824 may allow a user to request a ride, monitor the status of a matched ride, pay for a ride, monitor past rides, perform any other requestor-oriented services related to the ride matching system 802, and/or obtain any other requestor-oriented information from the ride matching system.

In some embodiments, requestor computing device 804 is configured to communicate with the ride matching system 802 in order to request a service. The requestor computing device 804 may include communication components that allow the requestor computing device to communicate over one or more communication networks to the ride matching system 802 and/or the autonomous vehicle 806. As shown, in some embodiments, the requestor computing device 804 may communicate 826 directly with autonomous vehicle 806. For example, requestor computing device 804 may pair with autonomous vehicle 806 over Bluetooth or other wireless communication system, to exchange information, provide ride instructions, receive ride information and updates, etc. The requestor computing device 804 may also include a location module 828 to allow the requestor computing device 804 to determine its current location and/or position. For example, the location module may implement global positioning system (GPS), cellular communications triangulation, and/or any other suitable location-based techniques to determine the coordinates or location of the requestor computing device 804. The requestor computing device 804 may include a display 830 which may include any suitable components to create visible and recognizable light. For example, the display may include LED arrays, a LCD display, a projector, and/or any other components that create visible light, pixels, and/or images. In various embodiments, the display may also operate as a touchscreen interface through which user inputs may be received to, e.g., provide pickup and drop-off locations, request to begin or end an autonomous ride, etc.

In some embodiments, AV interface 810 may include any software and/or hardware configured to send and receive communications and/or other information between the ride matching system 802 and a plurality of autonomous vehicles 806. The AV interface 810 may be configured to periodically receive location information, vehicle and/or ride status information, and/or any other relevant information from the autonomous vehicle 806. Additionally, the AV interface 810 may be configured to send ride requests, requestor location information, pick-up locations, travel routes, pick-up estimates, traffic information, provider updates/notifications, autonomous vehicle operating instructions, and/or any other relevant information to the autonomous vehicle 806.

In some embodiments, autonomous vehicle 806 can include an in-vehicle computing device 832, such as any computing device that is configured to communicate with ride matching system 802 and/or requestor computing device 804 over one or more communication networks. The in-vehicle computing device may comprise a processor, a computer-readable memory, and communication hardware and/or software to allow the in-vehicle computing device 832 to communicate over one or more communication networks. In some embodiments, the in-vehicle computing device 832 can be integrated into the autonomous vehicle's computer system, such as a part of the autonomous vehicle's data processing and control system and made user accessible through a display 834 or other user interface device built into the autonomous vehicle (e.g., in-dash, console, seatback, or other location). Additionally, or alternatively, the in-vehicle communication device 832 may include a mobile phone, a tablet, a smart watch, a laptop computer, a desktop computer, and/or any other suitable device having a processor, memory, and communication hardware. In some embodiments, the in-vehicle computing device 832 may include an autonomous application 836 that is configured to manage communications with the ride matching system 802 and interface with the user of the in-vehicle computing device 832. The autonomous application 836 may allow a user to lock and unlock the autonomous vehicle, start and end autonomous rides, add or change drop-off locations, select localized pickup and drop-off location locations, and otherwise control the autonomous vehicle during the autonomous ride.

In some embodiments, provider selection module 812 may include a software module that is configured to process ride requests, ride responses, and other communications between requestors and providers of the ride matching system 802 to match a requestor and a provider for a requested service. For example, when a ride request is received from requestor computing device 804, the provider selection module 812 may identify available ride types that may service that request. For example, available ride types may be determined based on a user profile indicating that the user has opted in to receiving autonomous rides. In some embodiments, provider selection module 812 may select available vehicles based on vehicle state. For example, vehicles requiring maintenance (e.g., due to low power, a flat tire, or other maintenance condition) may not be matched in favor of vehicles that do not require maintenance.

As discussed, these ride types may be displayed in a requestor application 824 and selected by the requestor. In some embodiments, provider selection module may be configured to identify available providers for a ride request from a requestor by identifying a geographic region associated with the pick-up location. Some ride types, such as autonomous rides may require additional information, such as drop-off location or locations. Provider selection module can use the pickup and drop-off locations to determine whether an autonomous vehicle is an option to service the request. For example, one or more autonomous routes may be defined in data store 818. These autonomous routes may be defined from designated pickup and drop-off locations in a given geographic area. In some embodiments, a requestor may be associated with a user profile. A user may opt in to receive autonomous rides as a type of ride option when being matched. The user profile may include an indication as to the user's opt-in status and provide autonomous ride matches based on that status.

If the pickup and drop-off locations received in the ride request are each within one or more threshold distances of the designated pickup and drop-off locations, the autonomous ride type may be presented as an option to the requestor. Additionally, or alternatively, autonomous regions may be defined in data store 820 for a given geographic region. Each autonomous region may be associated with mapping, driving, and/or roadway conditions that allow autonomous vehicles to navigate between most locations within the region. For example, the speed limit may be below 35 miles per hour in the entire region, or there is no highway access in the region, or other conditions. For example, autonomous regions may be limited to particular hours and/or particular days. In some embodiments, an autonomous region may not include a school zone when school is in session, so the area is only an autonomous region for ride matching purposes outside of school hours. If the pickup and drop-off locations received in the request are both included in the same autonomous region, or contiguous autonomous regions, the autonomous ride type may be presented as an option.

If an autonomous ride type is selected, the provider selection module may instruct an autonomous vehicle 806 to go to the pickup location using autonomous vehicle control module 814. In some embodiments, ride control module 838 can receive a pickup location from autonomous vehicle control module 814 and begin traveling to the pickup location. In some embodiments, a particular route may be provided to ride control module 838 by autonomous routing module 816. For example, autonomous routing module 816 may identify one or more autonomous routes 818 to use based on current traffic, weather, or other roadway conditions. In some embodiments, ride control module 838 can use location module 842 to determine when the autonomous vehicle is within a threshold distance of the pickup location. In some embodiments, ride matching system 802 can periodically request location updates from autonomous vehicle 806. In some embodiments, autonomous vehicle 806 can periodically send location updates to ride matching system 802. Once it is determined that the autonomous vehicle is within the threshold distance, ride matching system 802 can cause requestor computing device 804 to display a pickup GUI. The pickup GUI can indicate multiple pickup locations localized to the pickup location. In some embodiments, the pickup locations can be defined in stop data 822.

The requestor can select a localized pickup location, as discussed above with respect to FIG. 3. The localized pickup location information can be sent to the ride matching system 802 which may instruct the autonomous vehicle 806 through ride control module 838 to go to the selected location. In some embodiments, the pickup GUI can be displayed at any time after the ride has been matched, regardless of the current distance between the autonomous vehicle and the requestor.

In some embodiments, when the autonomous vehicle arrives at the selected location, the autonomous vehicle can send an arrival notification to ride matching system. The ride matching system can cause the requestor computing device to display an unlock GUI, as discussed above with respect to FIGS. 4A-4B. The ride matching system can receive a request to unlock the autonomous vehicle. If the requestor computing device is authorized to unlock the vehicle, the ride matching system can cause the autonomous vehicle to unlock using the ride control module 838. Similarly, a request to start the ride can be received from the requestor computer device and cause the autonomous vehicle to begin the ride by sending a start instruction to the ride control module. While the ride is in progress, the autonomous vehicle and/or ride matching system can monitor for a stop request from the requestor computing device. If a stop request is received, ride control module 838 can cause the autonomous vehicle to stop the ride. In some embodiments, the autonomous vehicle can connect directly to the requestor computing device, such as by pairing with the computing device, and receive the unlock, start, and/or stop instructions directly from the requestor computing device.

In some embodiments, ride control module 838 can use location module 842 to determine when the autonomous vehicle is within a threshold distance of the drop-off location. Ride matching system 802 can periodically request location updates from autonomous vehicle 806. In some embodiments, autonomous vehicle 806 can periodically send location updates to ride matching system 802. Once it is determined that the autonomous vehicle is within the threshold distance, ride matching system 802 can cause requestor computing device 804 to display a drop-off GUI and/or cause the autonomous vehicle to display the drop-off GUI. The drop-off GUI can indicate multiple drop-off locations localized to the drop-off location. In some embodiments, the drop-off locations can be defined in stop data 822. The requestor can select a localized drop-off location, as discussed above with respect to FIG. 6. The localized drop-off location information can be sent to the ride matching system 802 which may instruct the autonomous vehicle 806 through ride control module 838 to go to the selected location. Additionally, or alternatively, drop-off control module can request localized drop-off location information from stop data 822 and cause the drop-off location GUI to be displayed on in-vehicle computing device 832.

In some embodiments, when the autonomous vehicle arrives at the selected location, the autonomous vehicle can send a drop-off notification to ride matching system 802 and/or requestor computing device 804. The ride matching system can cause the requestor computing device to display a drop-off GUI, as discussed above with respect to FIGS. 7A-7B. The ride matching system can receive a request to unlock the autonomous vehicle. If the requestor computing device is authorized to unlock the vehicle, the ride matching system can cause the autonomous vehicle to unlock using the ride control module 838. Once the ride is complete, a message indicating that the requestor has exited the vehicle and completed the ride can be received. The autonomous vehicle may then wait for further instructions from autonomous ride system 802 and/or begin driving a route until further instructions are received.

Figure 9:
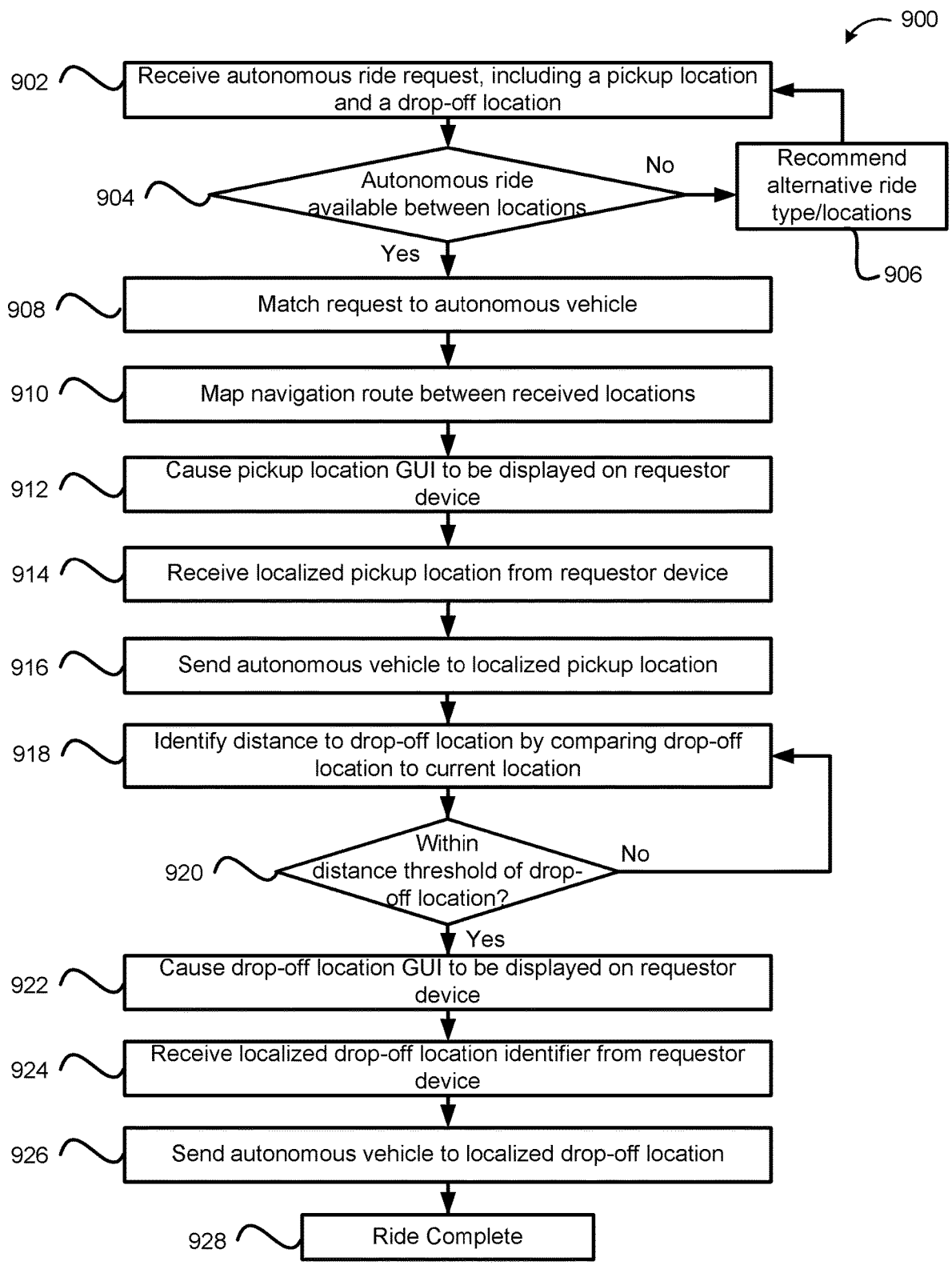
FIG. 9 illustrates an exemplary flow diagram of a method of autonomous ride management using localized pickup and drop-off locations, in accordance with an embodiment.

FIG. 9 illustrates an exemplary flow diagram of a method 900 of autonomous ride management using localized pickup and drop-off locations, in accordance with an embodiment. At step 902, a ride request is received from a requestor computing device. The ride request can include a pickup location and a drop-off location. In some embodiments, the ride request can include a ride type, such as autonomous ride type.

At step 904, it can be determined whether an autonomous ride is available between the pickup location and the drop-off location received in the request. As discussed, in some embodiments, it can be determined whether the pickup location and the drop-off location are both located in an autonomous region, or in contiguous autonomous regions. In some embodiments, it can be determined whether at least one autonomous route exists between the pickup location and the drop-off location. If an autonomous ride is not available between the locations, at step 906 alternative ride types or locations may be recommended. If an autonomous ride is available between the locations, at step 908 the ride request can be matched to an autonomous vehicle. In some embodiments, at step 910 a route between the pickup location and drop-off location can be mapped. The route can then be sent to the autonomous vehicle.

At step 912, a pickup location graphical user interface (GUI) can be caused to be displayed on the requestor computer device. In some embodiments, the pickup location GUI can be displayed when the autonomous vehicle is within a threshold distance of the pickup location. In some embodiments, the pickup location GUI can be displayed at any time after the ride has been matched. As discussed, the pickup location GUI can show a localized view of the pickup location and include a plurality of localized pickup locations. At step 914, a localized pickup location can be received from the requestor computing device. In some embodiments, a pickup location identifier can be received. The ride matching system can identify the localized pickup location in a stop data store using the localized pickup identifier. At step 916, the autonomous vehicle can be sent to the localized pickup location corresponding to the localized pickup location identifier.

In some embodiments, a message can be received from the autonomous vehicle indicating the autonomous ride has started and the location of the autonomous vehicle can be monitored. At step 918, the distance to the drop-off location can be determined. At step 920, it can be determined whether the distance between the drop-off location and a current location of the autonomous vehicle is within a threshold distance. If the autonomous vehicle is not within the threshold distance, the ride matching system can continue monitoring its location. If the distance is within the threshold distance, at step 922 a drop-off location GUI can be caused to be displayed. In some embodiments, the drop-off location GUI is displayed on a display of an in-vehicle computing device.

At step 924, a localized drop-off location identifier can be received. In some embodiments, a selection of the localized drop-off location identifier can be received through the drop-off location GUI on a display of the in-vehicle computing device. At step 926, the autonomous vehicle can be sent to the localized drop-off location corresponding to the localized drop-off location identifier. On arrival, at step 928, the ride can complete. In some embodiments, if additional drop-off locations have been received, the process can return to step 918 for the next drop-off location.

Figure 10:
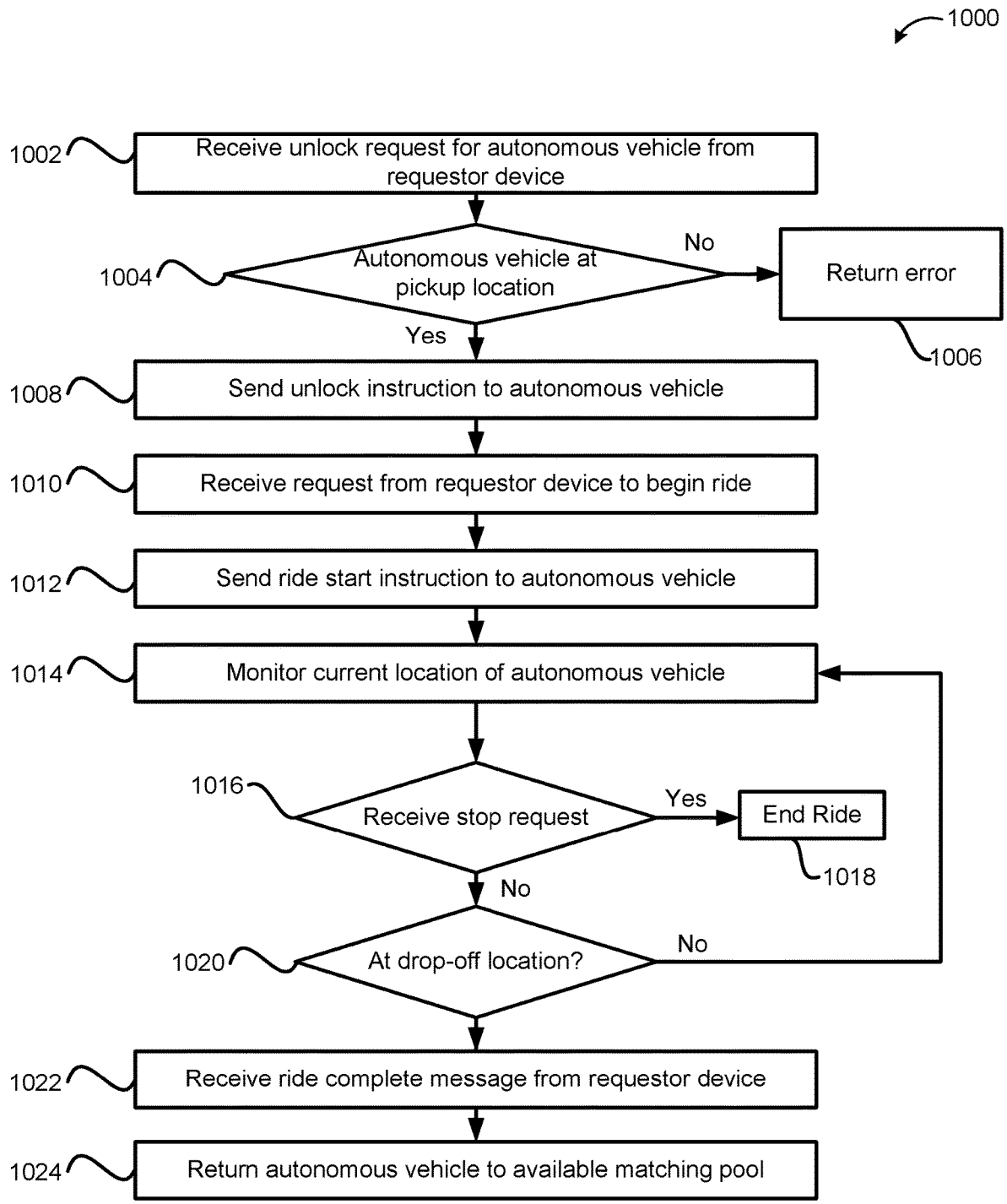
FIG. 10 illustrates an exemplary flow diagram of a method of autonomous pickup and drop-off, in accordance with an embodiment.

FIG. 10 illustrates an exemplary flow diagram of a method 1000 of autonomous pickup and drop-off, in accordance with an embodiment. At step 1002 an unlock request for an autonomous vehicle can be received from a requestor device. At step 1004, it can be determined whether the autonomous vehicle is at a pickup location. In some embodiments, the current state of the autonomous vehicle may also be determined, such as whether the autonomous vehicle is currently stopped, moving, etc. If the autonomous vehicle is not at the pickup location, at step 1006 an error can be returned. For example, a message indicating that the autonomous vehicle cannot be unlocked because it has not arrived can be sent to the requestor device.

If the autonomous vehicle is at the pickup location, at step 1008 an unlock instruction can be sent to the autonomous vehicle. At step 1010 a request can be received from the requestor device to begin an autonomous ride. At step 1012, a ride start instruction can be sent to the autonomous vehicle. At step 1014, the current location of the autonomous vehicle can be monitored. At step 1016, it can be determined whether a stop request has been received. If so, at step 1018, the autonomous ride can be ended. At step 1020, it can be determined whether the autonomous vehicle is at the drop-off location. If not, the location can continue to be monitored.

At step 1022, if the autonomous vehicle has been determined to be at the drop-off location, a ride complete message can be received. In some embodiments, after arriving at the drop-off location, a second unlock request can be received for the autonomous vehicle. It can be determined whether the autonomous vehicle is stopped. If so, an instruction can be sent to unlock the autonomous vehicle. In some embodiments, the second unlock request is received from an in-vehicle computing device. At step 1024, the autonomous vehicle can be returned to an available ride matching pool.

Figure 11:
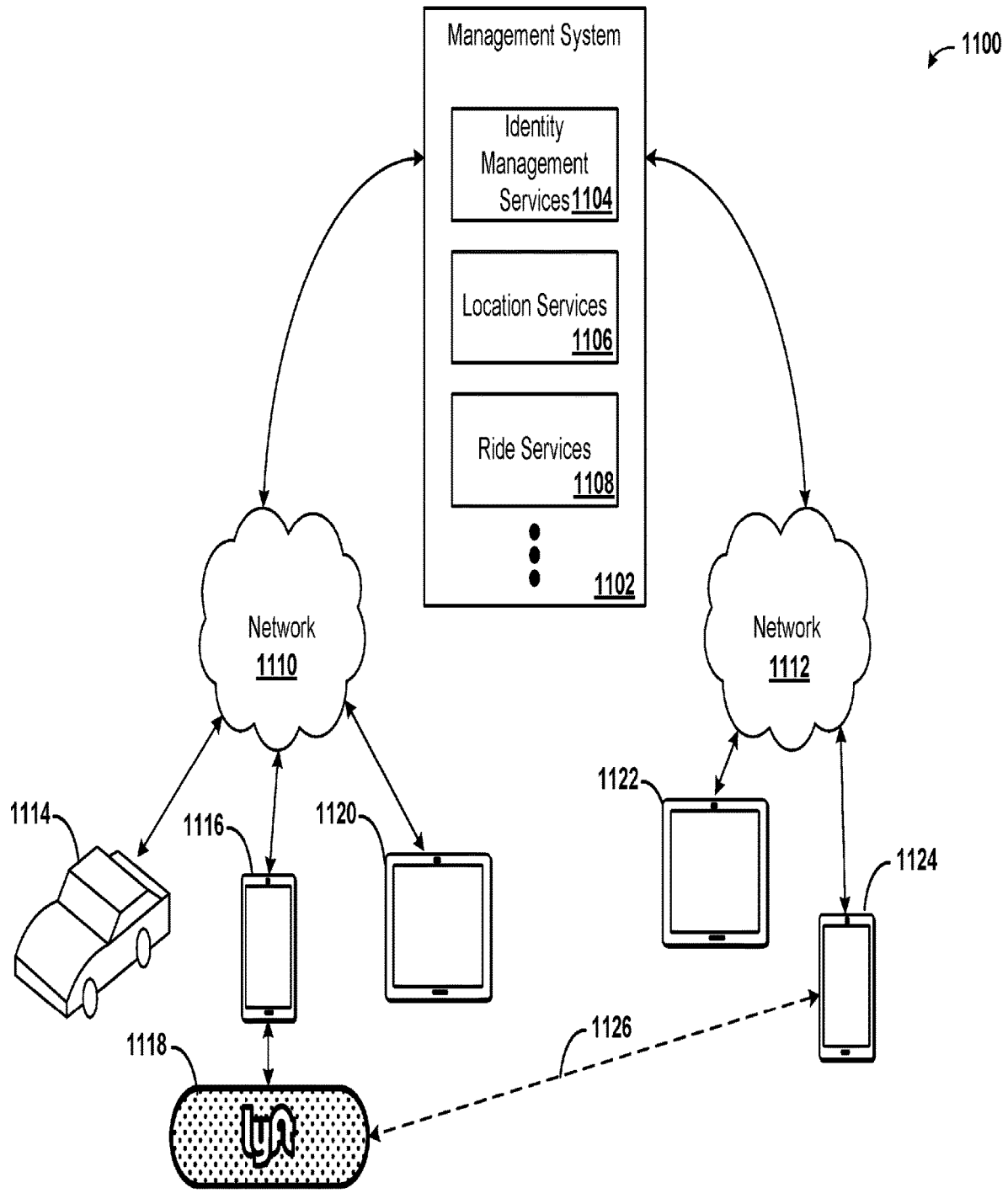
FIG. 11 illustrates an example requester/provider management environment, in accordance with various embodiments.

FIG. 11 shows a requestor/provider management environment 1100, in accordance with various embodiments. As shown in FIG. 11, a management system 1102 can be configured to provide various services to requestor and provider devices. Management system 1102 can run one or more services or software applications, including identity management services 1104, location services 1106, ride services 1108, or other services. Although three services are shown as being provided by management system 1102, more or fewer services may be provided in various implementations. In various embodiments, management system 1102 may include one or more general purpose computers, server computers, clustered computing systems, cloud-based computing systems, or any other computing systems or arrangements of computing systems. Management system 1102 may be configured to run any or all of the services and/or software applications described with respect to various embodiments described herein. In some embodiments, management system 1102 can run any appropriate operating system as well as various server applications, such as common gateway interface (CGI) servers, JAVA® servers, hypertext transport protocol (HTTP) servers, file transfer protocol (FTP) servers, database servers, etc.

For example, identity management services 1104 may include various identity services, such as access management and authorization services for requestors and providers when interacting with management system 1102. This may include, e.g., authenticating the identity of providers and determining that the providers are authorized to provide services through management system 1102. Similarly, requestors' identities may be authenticated to determine whether the requestor is authorized to receive the requested services through management system 1102. Identity management services 1104 may also control access to provider and requestor data maintained by management system 1102, such as driving and/or ride histories, personal data, or other user data. Location services 1106 may include navigation and/or traffic management services and user interfaces, or other location services.

In various embodiments, ride services 1108 may include ride matching and management services to connect a requestor to a provider. Ride services 1108 may include a user interface and or may receive data from requestors and providers through applications executing on their respective devices. Ride services 1108 may, e.g., confirm the identity of requestors and providers using identity management services 1104, and determine that each user is authorized for the requested ride service. In some embodiments, ride services 1108 can identify an appropriate provider using a location obtained from a requestor and location services 1106 to identify, e.g., a closest provider. As such, ride services 1108 can manage the distribution and allocation of provider and requestor resources, consistent with embodiments described herein.

Management system 1102 can connect to various devices through network 1110 and 1112. Networks 1110, 1112 can include any network configured to send and/or receive data communications using various communication protocols, such as AppleTalk, transmission control protocol/Internet protocol (TCP/IP), Internet packet exchange (IPX), systems network architecture (SNA), etc. In some embodiments, networks 1110, 1112 can include local area networks (LAN), such as Ethernet, Token-Ring or other LANs. Networks 1110, 1112 can include a wide-area network and/or the Internet. In some embodiments, networks 1110, 1112 can include VPNs (virtual private networks), PSTNs (a public switched telephone networks), infra-red networks, or any wireless network, including networks implementing the IEEE 802.11 family of standards, Bluetooth®, Bluetooth® Low Energy, NFC and/or any other wireless protocol. In various embodiments, networks 1110, 1112 can include a mobile network, such as a mobile telephone network, cellular network, satellite network, or other mobile network. Networks 1110, 1112 may be the same as communication network 170 in FIG. 1. In some embodiments, networks 1110, 1112 may each include a combination of networks described herein or other networks as are known to one of ordinary skill in the art.

Users may then utilize one or more services provided by management system 1102 using applications executing on provider and requestor devices. As shown in FIG. 11, provider computing devices 1114, 1116, 1118, and/or 1120 may include mobile devices (e.g., an iPhone®, an iPad®, mobile telephone, tablet computer, a personal digital assistant (PDA)), wearable devices (e.g., head mounted displays, etc.), thin client devices, gaming consoles, or other devices configured to communicate over one or more networks 1110, 1112. Each provider or requestor device can execute various operating systems (e.g., Android, iOS, etc.) and configured to communicate over the Internet, Blackberry® messenger, short message service (SMS), email, and various other messaging applications and/or communication protocols. The requestor and provider computing devices can include general purpose computers (e.g., personal computers, laptop computers, or other computing devices executing operating systems such as macOS®, Windows®, Linux®, various UNIX® or UNIX- or Linux-based operating systems, or other operating systems). In some embodiments, provider computing device 1114 can include a vehicle-integrated computing device, such as a vehicle navigation system, or other computing device integrated with the vehicle itself.

In some embodiments, provider computing device 1118 can include a provider communication device configured to communicate with users, such as drivers, passengers, pedestrians, and other users. In some embodiments, provider communication device 1118 can communicate directly with management system 1102 or through another provider computing device, such as provider computing device 1116. In some embodiments, a requestor computing device can communicate 1126 directly with provider communication device 1118 over a peer-to-peer connection, Bluetooth connection, NFC connection, ad hoc wireless network, or any other communication channel or connection. Although particular devices are shown as communicating with management system 1102 over networks 1110 and 1112, in various embodiments, management system 1102 can expose an interface, such as an application programming interface (API) or service provider interface (SPI) to enable various third parties which may serve as an intermediary between end users and management system 1102.

Although requestor/provider management environment 1100 is shown with four provider devices and two requestor devices, any number of devices may be supported. The various components shown and described herein may be implemented in hardware, firmware, software, or combinations thereof. Although one embodiment of a requestor/provider management environment is depicted in FIG. 11, this is merely one implementation and not meant to be limiting.

Figure 12:
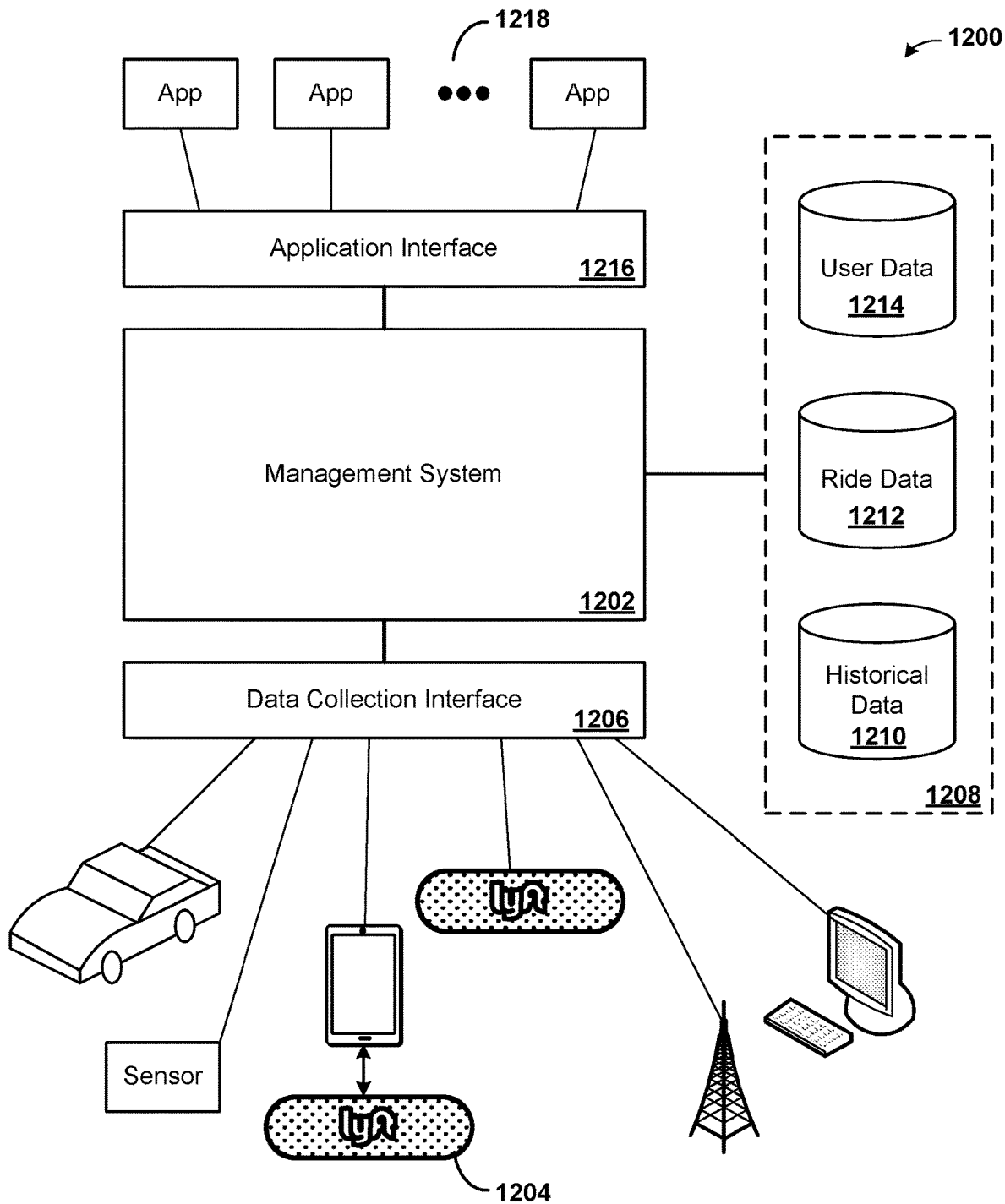
FIG. 12 illustrates an example data collection and application management system, in accordance with various embodiments.

FIG. 12 shows a data collection and application management environment 1200, in accordance with various embodiments. As shown in FIG. 12, management system 1202 may be configured to collect data from various data collection devices 1204 through a data collection interface 1206. As discussed above, management system 1202 may include one or more computers and/or servers or any combination thereof. Data collection devices 1204 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1206 can include, e.g., an extensible device framework configured to support interfaces for each data collection device. In various embodiments, data collection interface 1206 can be extended to support new data collection devices as they are released and/or to update existing interfaces to support changes to existing data collection devices. In various embodiments, data collection devices may communicate with data collection interface 1206 over one or more networks. The networks may include any network or communication protocol as would be recognized by one of ordinary skill in the art, including those networks discussed above.

As shown in FIG. 12, data received from data collection devices 1204 can be stored in data store 1208. Data store 1208 can include one or more data stores, such as databases, object storage systems and services, cloud-based storage services, and other data stores. For example, various data stores may be implemented on a non-transitory storage medium accessible to management system 1202, such as historical data store 1210, ride data store 1212, and user data store 1214. Data stores 1208 can be local to management system 1202, or remote and accessible over a network, such as those networks discussed above or a storage-area network or other networked storage system. In various embodiments, historical data 1210 may include historical traffic data, weather data, request data, road condition data, or any other data for a given region or regions received from various data collection devices. Ride data 1212 may include route data, request data, timing data, and other ride related data, in aggregate and/or by requestor or provider. User data 1214 may include user account data, preferences, location history, and other user-specific data. Although particular data stores are shown, any data collected and/or stored according to the various embodiments described herein may be stored in data stores 1208.

As shown in FIG. 12, an application interface 1216 can be provided by management system 1202 to enable various apps 1218 to access data and/or services available through management system 1202. Apps 1218 can run on various user devices (including provider and requestor computing devices, such as those discussed above) and/or may include cloud-based or other distributed apps configured to run across various devices (e.g., computers, servers, or combinations thereof). Apps 1218 may include, e.g., aggregation and/or reporting apps which may utilize data 1208 to provide various services (e.g., third-party ride request and management apps). In various embodiments, application interface 1216 can include an API and/or SPI enabling third party development of apps 1218. In some embodiments, application interface 1216 may include a web interface, enabling web-based access to data 1208 and/or services provided by management system 1202. In various embodiments, apps 1218 may run on devices configured to communicate with application interface 1216 over one or more networks. The networks may include any network or communication protocol as would be recognized by one of ordinary skill in the art, including those networks discussed above, in accordance with an embodiment of the present disclosure.

Although a particular implementation of environment 1200 is shown in FIG. 12, this is for illustration purposes only and not intended to be limited. In some embodiments, environment 1200 may include fewer or more components, as would be recognized by one or ordinary skill in the art.

Figure 13A:
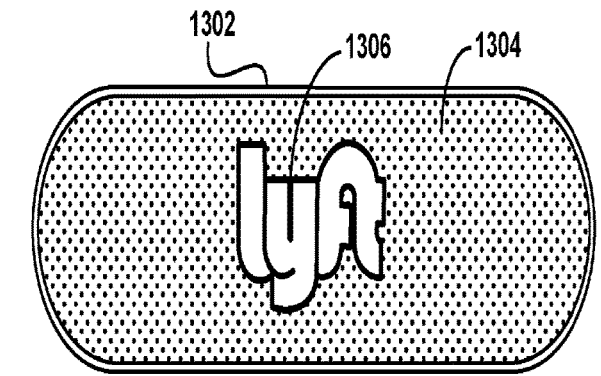
FIGS. 13A-13C illustrates an example provider communication device in accordance with various embodiments.
Figure 13B:
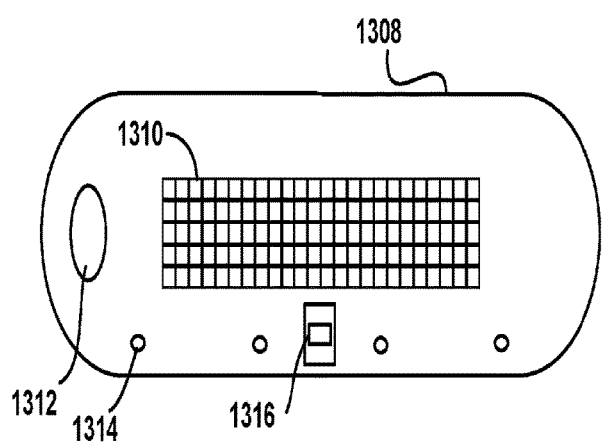
Figure 13C:
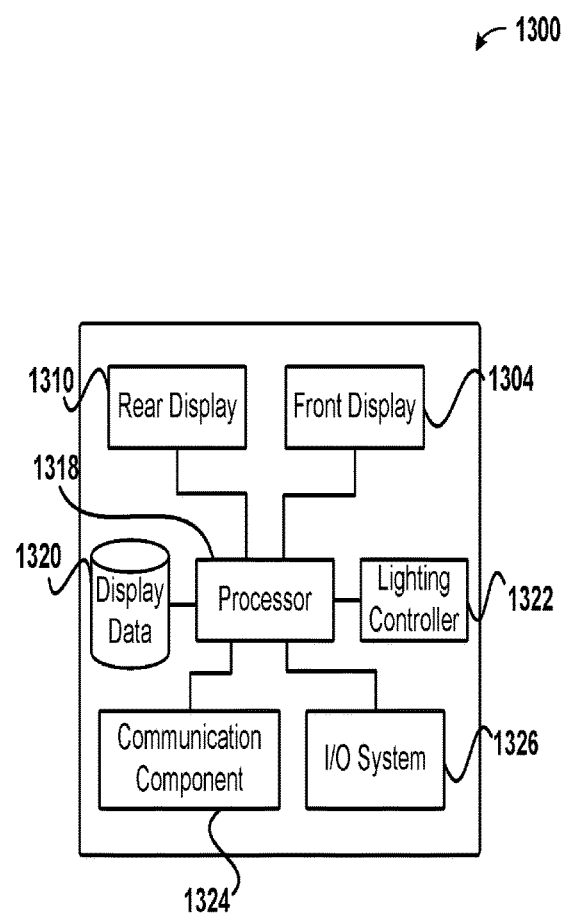

FIGS. 13A-13C show an example provider communication device 1300 in accordance with various embodiments. As shown in FIG. 13A, a front view 1302 of provider communication device 1300 shows a front display 1304. In some embodiments, front display 1304 may include a secondary region or separate display 1306. As shown in FIG. 13A, the front display may include various display technologies including, but not limited to, one or more liquid crystal displays (LCDs), one or more arrays of light emitting diodes (LEDs), or other display technologies. In some embodiments, the front display may include a cover that divides the display into multiple regions. In some embodiments, separate displays may be associated with each region. The front display 1304 can be configured to show colors, patterns, color patterns, or other identifying information to requestors and other users external to a provider vehicle. In some embodiments, the secondary region or separate display 1306 may be configured to display the same, or contrasting, information as front display 1304.

As shown in FIG. 13B, a rear view 1308 of provider communication device 1300 shows a rear display 1310. Rear display 1310, as with front display 1304, rear display 1310 may include various display technologies including, but not limited to, one or more liquid crystal displays (LCDs), one or more arrays of light emitting diodes (LEDs), or other display technologies. The rear display may be configured to display information to the provider, the requestor, or other users internal to a provider vehicle. In some embodiments, rear display 1310 may be configured to provide information to users external to the provider vehicle who are located behind the provider vehicle. As further shown in FIG. 13B, provider communication device may include a power button 1312 or other switch which can be used to turn on or off the provider communication device. In various embodiments, power button 1312 may be a hardware button or switch that physically controls whether power is provided to provider communication device 1300. Alternatively, power button 1312 may be a soft button that initiates a startup/shutdown procedure managed by software and/or firmware instructions. In some embodiments, provider communication device 1300 may not include a power button 1312.

Additionally, provider communication device may include one or more light features 1314 (such as one or more LEDs or other light sources) configured to illuminate areas adjacent to the provider communication device 1300. In some embodiments, provider communication device 1300 can include a connector to enable a provider computing device to be connected to the provider communication device 1300. In some embodiments, power may be provided to the provider communication device through connector 1316.

FIG. 13C shows a block diagram of provider computing device 1300. As shown in FIG. 13C, provider communication device can include a processor 1318. Processor 1318 can control information displayed on rear display 1310 and front display 1304. As noted, each display can display information to different users, depending on the positioning of the users and the provider communication device. In some embodiments, display data 1320 can include stored display patterns, sequences, colors, text, or other data to be displayed on the front and/or rear display. In some embodiments, display data 1320 can be a buffer, storing display data as it is received from a connected provider computing device. In some embodiments, display data 1320 can include a hard disk drive, solid state drive, memory, or other storage device including information from a management system. In some embodiments, lighting controller 1322 can manage the colors and/or other lighting displayed by light features 1314. In some embodiments, communication component 1324 can manage networking or other communication between the provider communication device 1300 and one or more networking components or other computing devices. In various embodiments, communication component 1324 can be configured to communicate over Wi-Fi, Bluetooth, NFC, RF, or any other wired or wireless communication network or protocol. In some embodiments, provider communication device 1300 can include an input/output system 1326 configured to provide output in addition to that provided through the displays and/or to receive inputs from users. For example, I/O system 1326 can include an image capture device configured to recognize motion or gesture-based inputs from a user. Additionally, or alternatively, I/O system 1326 can include an audio device configured to provide audio outputs (such as alerts, instructions, or other information) to users and/or receive audio inputs, such as audio commands, which may be interpreted by a voice recognition system or other command interface. In some embodiments, I/O system may include one or more input or output ports, such as USB (universal serial bus) ports, lightning connector ports, or other ports enabling users to directly connect their devices to the provider communication device (e.g., to exchange data, verify identity information, provide power, etc.).

Figure 14:
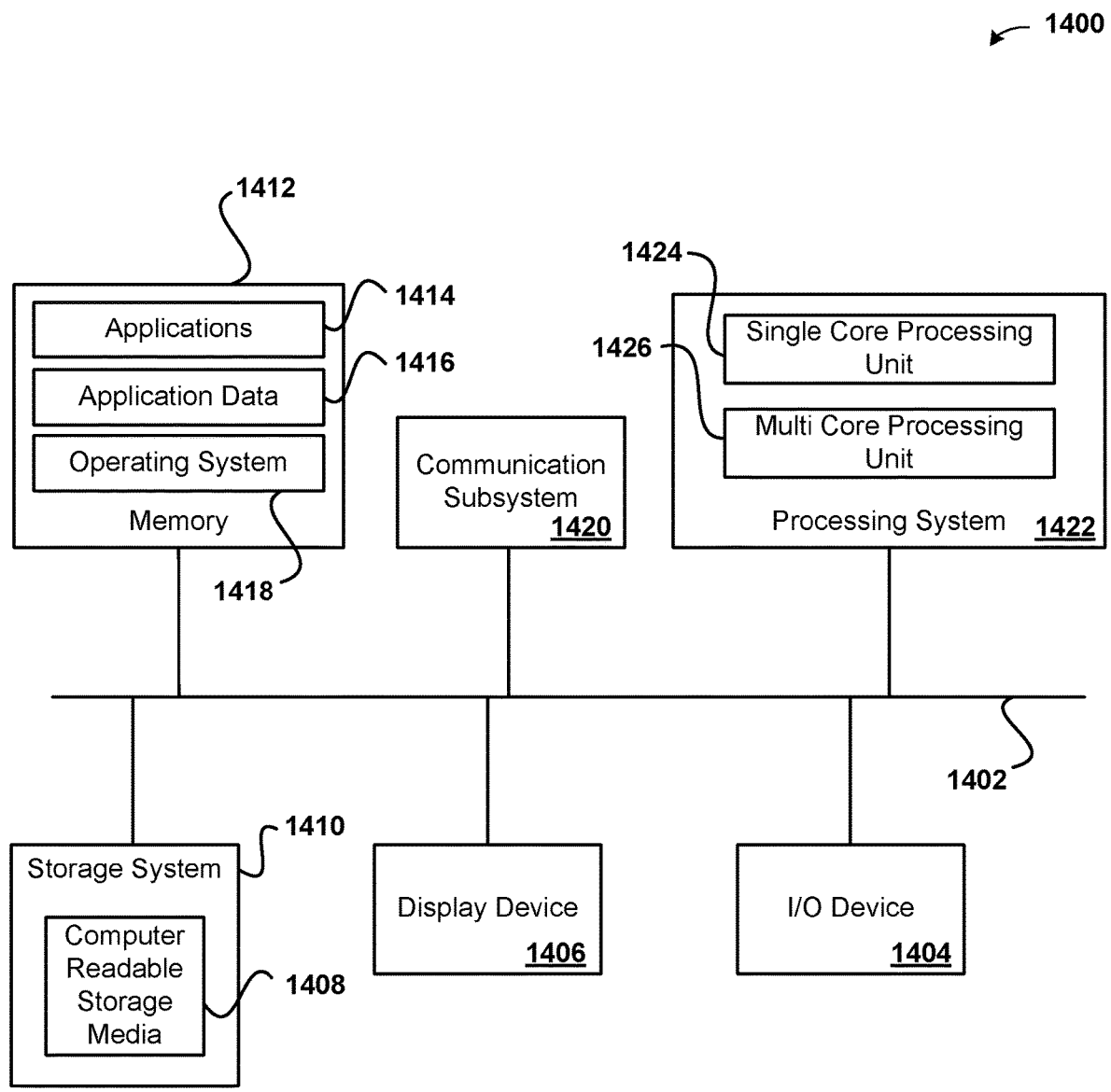
FIG. 14 illustrates an example computer system, in accordance with various embodiments.

FIG. 14 shows an example computer system 1400, in accordance with various embodiments. In various embodiments, computer system 1400 may be used to implement any of the systems, devices, or methods described herein. In some embodiments, computer system 1400 may correspond to any of the various devices described herein, including, but not limited to, mobile devices, tablet computing devices, wearable devices, personal or laptop computers, vehicle-based computing devices, or other devices or systems described herein. As shown in FIG. 14, computer system 1400 can include various subsystems connected by a bus 1402. The subsystems may include an I/O device subsystem 1404, a display device subsystem 1406, and a storage subsystem 1410 including one or more computer readable storage media 1408. The subsystems may also include a memory subsystem 1412, a communication subsystem 1420, and a processing subsystem 1422.

In system 1400, bus 1402 facilitates communication between the various subsystems. Although a single bus 1402 is shown, alternative bus configurations may also be used. Bus 1402 may include any bus or other component to facilitate such communication as is known to one of ordinary skill in the art. Examples of such bus systems may include a local bus, parallel bus, serial bus, bus network, and/or multiple bus systems coordinated by a bus controller. Bus 1402 may include one or more buses implementing various standards such as Parallel ATA, serial ATA, Industry Standard Architecture (ISA) bus, Extended ISA (EISA) bus, MicroChannel Architecture (MCA) bus, Peripheral Component Interconnect (PCI) bus, or any other architecture or standard as is known in the art.

In some embodiments, I/O device subsystem 1404 may include various input and/or output devices or interfaces for communicating with such devices. Such devices may include, without limitation, a touch screen or other touch-sensitive input device, a keyboard, a mouse, a trackball, a motion sensor or other movement-based gesture recognition device, a scroll wheel, a click wheel, a dial, a button, a switch, audio recognition devices configured to receive voice commands, microphones, image capture based devices such as eye activity monitors configured to recognize commands based on eye movement or blinking, and other types of input devices. I/O device subsystem 1404 may also include identification or authentication devices, such as fingerprint scanners, voiceprint scanners, iris scanners, or other biometric sensors or detectors. In various embodiments, I/O device subsystem may include audio output devices, such as speakers, media players, or other output devices.

Computer system 1400 may include a display device subsystem 1406. Display device subsystem may include one or more lights, such as an one or more light emitting diodes (LEDs), LED arrays, a liquid crystal display (LCD) or plasma display or other flat-screen display, a touch screen, a head-mounted display or other wearable display device, a projection device, a cathode ray tube (CRT), and any other display technology configured to visually convey information. In various embodiments, display device subsystem 1406 may include a controller and/or interface for controlling and/or communicating with an external display, such as any of the above-mentioned display technologies.

As shown in FIG. 14, system 1400 may include storage subsystem 1410 including various computer readable storage media 1408, such as hard disk drives, solid state drives (including RAM-based and/or flash-based SSDs), or other storage devices. In various embodiments, computer readable storage media 1408 can be configured to store software, including programs, code, or other instructions, that is executable by a processor to provide functionality described herein. In some embodiments, storage system 1410 may include various data stores or repositories or interface with various data stores or repositories that store data used with embodiments described herein. Such data stores may include, databases, object storage systems and services, data lakes or other data warehouse services or systems, distributed data stores, cloud-based storage systems and services, file systems, and any other data storage system or service. In some embodiments, storage system 1410 can include a media reader, card reader, or other storage interface to communicate with one or more external and/or removable storage devices. In various embodiments, computer readable storage media 1408 can include any appropriate storage medium or combination of storage media. For example, computer readable storage media 1408 can include, but is not limited to, any one or more of random access memory (RAM), read only memory (ROM), electronically erasable programmable ROM (EEPROM), flash memory or other memory technology, optical storage (e.g., CD-ROM, digital versatile disk (DVD), Blu-ray® disk or other optical storage device), magnetic storage (e.g., tape drives, cassettes, magnetic disk storage or other magnetic storage devices). In some embodiments, computer readable storage media can include data signals or any other medium through which data can be transmitted and/or received.

Memory subsystem 1412 can include various types of memory, including RAM, ROM, flash memory, or other memory. Memory 1412 can include SRAM (static RAM) or DRAM (dynamic RAM). In some embodiments, memory 1412 can include a BIOS (basic input/output system) or other firmware configured to manage initialization of various components during, e.g., startup. As shown in FIG. 14, memory 1412 can include applications 1414 and application data 1416. Applications 1414 may include programs, code, or other instructions, that can be executed by a processor. Applications 1414 can include various applications such as browser clients, location management applications, ride management applications, data management applications, and any other application. Application data 1416 can include any data produced and/or consumed by applications 1414. Memory 1412 can additionally include operating system 1418, such as macOS®, Windows®, Linux®, various UNIX® or UNIX- or Linux-based operating systems, or other operating systems.

System 1400 can also include a communication subsystem 1420 configured to facilitate communication between system 1400 and various external computer systems and/or networks (such as the Internet, a local area network (LAN), a wide area network (WAN), a mobile network, or any other network). Communication subsystem 1420 can include hardware and/or software to enable communication over various wired (such as Ethernet or other wired communication technology) or wireless communication channels, such as radio transceivers to facilitate communication over wireless networks, mobile or cellular voice and/or data networks, WiFi networks, or other wireless communication networks. For example, the communication network is shown as communication network 140 in FIG. 1. Additionally, or alternatively, communication subsystem 1420 can include hardware and/or software components to communicate with satellite-based or ground-based location services, such as GPS (global positioning system). In some embodiments, communication subsystem 1420 may include, or interface with, various hardware or software sensors. The sensors may be configured to provide continuous or and/or periodic data or data streams to a computer system through communication subsystem 1420

As shown in FIG. 14, processing system 1422 can include one or more processors or other devices operable to control computing system 1400. Such processors can include single core processors 1424, multi core processors, which can include central processing units (CPUs), graphical processing units (GPUs), application specific integrated circuits (ASICs), digital signal processors (DSPs) or any other generalized or specialized microprocessor or integrated circuit. Various processors within processing system 1422, such as processors 1424 and 1426, may be used independently or in combination depending on application.

Various other configurations are may also be used, with particular elements that are depicted as being implemented in hardware may instead be implemented in software, firmware, or a combination thereof. One of ordinary skill in the art will recognize various alternatives to the specific embodiments described herein.

The specification and figures describe particular embodiments which are provided for ease of description and illustration and are not intended to be restrictive. Embodiments may be implemented to be used in various environments without departing from the spirit and scope of the disclosure.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method comprising:
receiving, by a transportation system, a ride request and a pickup location of a requestor from a requestor computing device;
matching, by the transportation system, the ride request to a vehicle;
sending, by the transportation system, instructions to cause the vehicle to travel towards the pickup location;
subsequent to the vehicle reaching the pickup location, receiving, by the transportation system, an unlock request from the requestor computing device to unlock the vehicle;
in response to the transportation system receiving the unlock request from the requestor computing device, determining, by the transportation system, (1) whether a current location of the vehicle indicates that the vehicle has reached the pickup location, (2) a state of the vehicle, and (3) an authorization of the requestor computing device to unlock a door of the vehicle; and
sending, by the transportation system, instructions to cause the door of the vehicle to unlock based on the current location of the vehicle indicating that the vehicle has reached the pickup location of the requestor, the state of the vehicle, and the requestor computing device being authorized to unlock the door.

2. The method of claim 1, wherein:
determining, by the transportation system, the state of the vehicle comprises determining whether the vehicle is currently moving or stopped; and
sending, by the transportation system, the instructions to cause the door of the vehicle to unlock is based on a determination that the vehicle has stopped.

3. The method of claim 1, wherein:
determining, by the transportation system, whether the current location of the vehicle indicates that the vehicle has reached the pickup location comprises determining whether the vehicle has reached the pickup location; and
sending, by the transportation system, the instructions to cause the door of the vehicle to unlock is based on a determination that the vehicle has reached the pickup location.

4. The method of claim 1, further comprising:
determining, by the transportation system, that the vehicle has reached the pickup location; and
subsequent to determining that the vehicle has reached the pickup location, sending, by the transportation system, instructions to cause a user interface of the requestor computing device to display a selectable element to unlock the vehicle;
wherein the unlock request to unlock the vehicle is transmitted by the requestor computing device in response to the selectable element having been selected by the requestor.

5. The method of claim 1, wherein, after causing the door of the vehicle to unlock, the method further comprises:
sending, by the transportation system, instructions to cause a user interface of the requestor computing device to indicate that the vehicle is unlocked.

6. The method of claim 1, wherein, after causing the door of the vehicle to unlock, the method further comprises:
receiving, by the transportation system, a drop-off location from the requestor computing device;
receiving, by the transportation system, a lock request from the requestor computing device to lock the door of the vehicle;
determining, by the transportation system, that one or more lock criteria associated with the vehicle are satisfied; and
sending, by the transportation system, instructions to cause the door of the vehicle to lock in response to the determination that the one or more lock criteria are satisfied.

7. The method of claim 6, further comprising:
determining, by the transportation system, that the vehicle has reached the drop-off location;
sending, by the transportation system, instructions to cause a user interface of the requestor computing device to display a selectable element to unlock the door of the vehicle;
receiving, by the transportation system, an additional unlock request from the requestor computing device to unlock the door of the vehicle, wherein the additional unlock request is transmitted by the requestor computing device in response to a user selecting the selectable element; and
sending, by the transportation system, instructions to cause the door of the vehicle to unlock in response to receiving the additional unlock request.

8. A transportation system comprising:
a processor; and
a computer-readable non-transitory storage media in communication with the processor, wherein the computer-readable non-transitory storage media includes instructions that are operable, when executed by the processor, to cause the transportation system to:
receive a ride request and a pickup location of a requestor from a requestor computing device;
match the ride request to a vehicle;
send instructions to cause the vehicle to travel towards the pickup location;
subsequent to the vehicle reaching the pickup location, receive an unlock request from the requestor computing device to unlock the vehicle;
in response to the transportation system receiving the unlock request, determine (1) whether a current location of the vehicle indicates that the vehicle has reached the pickup location, (2) a state of the vehicle, and (3) an authorization of the requestor computing device to unlock a door of the vehicle; and
send instructions to cause the door of the vehicle to unlock based on the current location of the vehicle indicating that the vehicle has reached the pickup location of the requestor, the state of the vehicle, and the requestor computing device being authorized to unlock the door.

9. The transportation system of claim 8, wherein:
determining the state of the vehicle comprises determining whether the vehicle is currently moving or stopped; and
sending the instructions to cause the door of the vehicle to unlock is based on a determination that the vehicle has stopped.

10. The transportation system of claim 8, wherein:
determining whether the current location of the vehicle indicates that the vehicle has reached the pickup location comprises determining whether the vehicle has reached the pickup location; and
sending the instructions to cause the door of the vehicle to unlock is based on a determination that the vehicle has reached the pickup location.

11. The transportation system of claim 8, wherein the instructions are operable, when executed by the processor, to further cause the transportation system to:

determine that the vehicle has reached the pickup location; and subsequent to determining that the vehicle has reached the pickup location, send instructions to cause a user interface of the requestor computing device to display a selectable element to unlock the vehicle;

wherein the unlock request to unlock the vehicle is transmitted by the requestor computing device in response to the selectable element having been selected by the requestor.

12. The transportation system of claim 8, wherein, after causing the door of the vehicle to unlock, the instructions are operable, when executed by the processor, to further cause the transportation system to:

send instructions to cause a user interface of the requestor computing device to indicate that the vehicle is unlocked.

13. The transportation system of claim 8, wherein, subsequent to sending the instructions to cause the door of the vehicle to unlock, the instructions are operable, when executed by the processor, to further cause the transportation system to:

receive a drop-off location from the requestor computing device;

receive a lock request from the requestor computing device to lock the door of the vehicle;

determine that one or more lock criteria associated with the vehicle are satisfied; and send instructions to cause the door of the vehicle to lock in response to the determination that the one or more lock criteria are satisfied.

14. One or more computer-readable non-transitory storage media including instructions that are operable when executed to cause one or more processors to:

receive a ride request and a pickup location of a requestor from a requestor computing device;

match the ride request to a vehicle;

send instructions to cause the vehicle to travel towards the pickup location;

subsequent to the vehicle reaching the pickup location, receive an unlock request from the requestor computing device to unlock the vehicle;

in response to a transportation system receiving the unlock request, determine (1) whether a current location of the vehicle indicates that the vehicle has reached the pickup location, (2) a state of the vehicle, and (3) an authorization of the requestor computing device to unlock a door of the vehicle; and send, by the transportation system, instructions to cause the door of the vehicle to unlock based on the current location of the vehicle indicating that the vehicle has reached the pickup location of the requestor, the state of the vehicle, and the requestor computing device being authorized to unlock the door.

15. The one or more computer-readable non-transitory storage media of claim 14, wherein the instructions are operable when executed to further cause one or more processors to:

determine that the vehicle has reached the pickup location; and subsequent to determining that the vehicle has reached the pickup location, send instructions to cause a user interface of the requestor computing device to display a selectable element to unlock the vehicle;

wherein the unlock request to unlock the vehicle is transmitted by the requestor computing device in response to the selectable element having been selected by the requestor.

16. The one or more computer-readable non-transitory storage media of claim 14, wherein:

determining the state of the vehicle comprises determining whether the vehicle is currently moving or stopped; and sending the instructions to cause the door of the vehicle to unlock is based on a determination that the vehicle has stopped.

17. The one or more computer-readable non-transitory storage media of claim 14, wherein the instructions are operable when executed to further cause the one or more processors to:

send instructions to cause, after instructing the vehicle to unlock the door, a user interface of the requestor computing device to indicate that the vehicle is unlocked.

18. The one or more computer-readable non-transitory storage media of claim 14, wherein, subsequent to sending the instructions to cause the door of the vehicle to unlock, the instructions are operable when executed to further cause the one or more processors to:

receive a drop-off location from the requestor computing device;

receive a lock request from the requestor computing device to lock the door of the vehicle;

determine that one or more lock criteria associated with the vehicle are satisfied; and send instructions to cause the door of the vehicle to lock in response to the determination that the one or more lock criteria are satisfied.

19. The one or more computer-readable non-transitory storage media of claim 18, wherein the instructions are operable when executed to further cause one or more processors to:

determine that the vehicle has reached the drop-off location;

send instructions to cause a user interface of the requestor computing device to display a selectable element to unlock the door of the vehicle;

receive an additional unlock request from the requestor computing device to unlock the door of the vehicle, wherein the additional unlock request is transmitted by the requestor computing device in response to a user selecting the selectable element; and send instructions to cause the door of the vehicle to unlock in response to receiving the additional unlock request.

20. The one or more computer-readable non-transitory storage media of claim 14, wherein:

determining whether the current location of the vehicle indicates that the vehicle has reached the pickup location comprises determining whether the vehicle has reached the pickup location; and sending the instructions to cause the door of the vehicle to unlock is based on a determination that the vehicle has reached the pickup location.

\* \* \* \* \*